(12) United States Patent
Takabayashi et al.

(10) Patent No.: US 8,666,200 B2
(45) Date of Patent: Mar. 4, 2014

(54) OPTICAL MODULATION DEVICE, DRIVING METHOD OF OPTICAL MODULATION DEVICE, AND MANUFACTURING METHOD OF OPTICAL MODULATION DEVICE

(71) Applicant: Fujitsu Limited, Kawasaki (JP)

(72) Inventors: Kazumasa Takabayashi, Atsugi (JP); Akinori Hayakawa, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/656,895

(22) Filed: Oct. 22, 2012

(65) Prior Publication Data

US 2013/0108204 A1    May 2, 2013

Related U.S. Application Data

(63) Continuation of application No. PCT/JP2010/057132, filed on Apr. 22, 2010.

(51) Int. Cl.
*G02F 1/035*    (2006.01)

(52) U.S. Cl.
USPC ............ 385/3; 385/1; 385/2; 385/14; 385/15; 385/27

(58) Field of Classification Search
USPC .............................. 385/1, 2, 3, 14, 15, 27, 31
See application file for complete search history.

(56) References Cited

U.S. PATENT DOCUMENTS

| | | | |
|---|---|---|---|
| 7,212,326 B2 * | 5/2007 | Wooten et ...................... | 359/245 |
| 7,321,702 B2 | 1/2008 | Akiyama | |
| 7,606,447 B2 * | 10/2009 | Wada .................................. | 385/3 |

(Continued)

FOREIGN PATENT DOCUMENTS

| | | |
|---|---|---|
| JP | 2005-326548 A1 | 11/2005 |
| JP | 2007-531022 A1 | 11/2007 |
| JP | 2010-15041 A1 | 1/2010 |
| JP | 2010-501908 A1 | 1/2010 |

OTHER PUBLICATIONS

I. Betty, et al.; "Zero Chirp 10 Gb/s MQW InP Mach-Zehnder Transmitter with Full-Band Tunability;" Optical Fiber Communication and the National Fiber Optic Engineers Conference 2007; 2007; pp. 1-3 and cover sheet (4 Sheets total)/Cited in International Search Report.
International Search Report for International Application No. PCT/JP2010/057132 dated Jun. 1, 2010.

*Primary Examiner* — Jennifer Doan

(74) *Attorney, Agent, or Firm* — Kratz, Quintos & Hanson, LLP

(57) ABSTRACT

When phases of lights passing through arms are adjusted, a first DC bias and a first modulation signal are applied to one arm from one modulating electrode, and a second DC bias and a second modulation signal are applied to the other arm from the other modulating electrode. The first and second DC biases are applied to the modulating electrodes such that a rate of a product of a length of one modulating electrode and the first DC bias and a product of a length of the other modulating electrode and the second DC bias is kept at a constant value. According to this constitution, it is possible to enable an optimum control of a phase difference between the arms and a precise control of wavelength chirp characteristics with a simple element constitution, and an optical modulation of which device size is small and having fine characteristics is enabled.

20 Claims, 18 Drawing Sheets

(56) References Cited

U.S. PATENT DOCUMENTS

| | | |
|---|---|---|
| 8,149,492 B2 | 4/2012 | Ghidini |
| 8,203,777 B2 | 6/2012 | Smith |
| 2005/0254743 A1 | 11/2005 | Akiyama |
| 2009/0003841 A1 | 1/2009 | Ghidini |
| 2010/0271682 A1 | 10/2010 | Smith |

* cited by examiner

OPTICAL MODULATION DEVICE, DRIVING METHOD OF OPTICAL MODULATION DEVICE, AND MANUFACTURING METHOD OF OPTICAL MODULATION DEVICE

CROSS-REFERENCE TO RELATED APPLICATION

This application is a continuation application of International Application PCT/JP2010/057132 filed on Apr. 22, 2010 and designated the U.S., the entire contents of which are incorporated herein by reference.

FIELD

The embodiments discussed herein are directed to an optical modulation device including Mach-Zehnder type optical waveguides, a driving method and a manufacturing method thereof.

BACKGROUND

An optical modulation device using so-called a Mach-Zehnder type modulator is focused as an optical modulation device operating in a wide wavelength range and in high-speed which is strongly expected as a light source of a WDM communication system capable of performing a high-capacity optical communication. At present, for example, an optical transmitter including a Mach-Zehnder interferometer type optical modulator (hereinafter, referred to just as an LN-MZ type optical modulator) using an electro-optical effect in a nonlinear optical crystal lithium niobate ($LiNbO_3$, LN) and a semiconductor laser is used in a long-distance and high-capacity optical communication system. Besides, in recent years, development of a semiconductor Mach-Zehnder (MZ) type optical modulator (hereinafter, referred to just as a semiconductor MZ type optical modulator) and a semiconductor MZ type optical modulator-integrated semiconductor laser has been in progress.

An example of the semiconductor MZ type optical modulator is illustrated in FIG. 19.

This semiconductor MZ type modulator is made up by including a first optical coupler 101 formed by a semiconductor waveguide, arms 102a, 102b, a second optical coupler 104 and modulating electrodes 103a, 103b.

The first optical coupler 101 includes an input port 101a, and is an input coupler splitting incident light into two pieces. The arms 102a, 102b are waveguides where two branched lights are propagated. The modulating electrodes 103a, 103b are formed on the waveguides of the arms 102a, 102b, and are electrodes to apply modulation signals to each of the arms 102a, 102b. The second optical coupler 104 includes an output port 104a, and is an output coupler multiplexing (coupling) the lights propagating through the arms 102a, 102b.

One end of each of the two arms 102a, 102b is connected to the first optical coupler 101 and the other end thereof is connected to the second optical coupler 104. The light incident from the input port 101a to the first optical coupler 101 is branched by the arms 102a, 102b, multiplexed by the second optical coupler 104 after each passing through the arms 102a, 102b, and output from the output port 104a. On/off states of output light are switched depending on an interference state of the light at the multiplexer. When a phase difference of the lights passing through the arms 102a, 102b at the time when they are coupled again at the output port 104a of the second optical coupler 104 is "0" (zero) (or $2N\pi$, where "N" is an integer), it becomes in the constructive interference state, and therefore, it becomes the ON state in which the light is output from the output port 104a. On the other hand, when the phase difference of the lights passing through the arms 102a, 102b at the time when they are coupled again at the output port 104a of the second optical coupler 104 is $\pi$ (or $(2N+1)\pi$), it becomes in the destructive interference state, and therefore, it becomes the OFF state in which the light is not output from the output port 104a.

For example, there is a method adjusting a phase by using a refractive index change generated when an electric field is applied to the arms 102a, 102b and so on as an adjustment method of the phase of the light passing through the arms 102a, 102b. Accordingly, when modulating voltage signals are applied to the arms 102a, 102b by the modulating electrodes 103a, 103b, changes of the phases occur at the arms 102a, 102b in accordance with the modulating voltage signals, and as a result, intensity of the output light is modulated. At first, it is necessary for the modulation signals applied to the arms 102a, 102b to have an amplitude large enough to change the phase difference for $\pi$ to perform a fine optical modulation. In addition, it is necessary to control the phase difference of the lights passing through the arms 102a, 102b such that the phase difference at an OFF level of the modulating voltage signal is $\pi$, and the phase difference at an ON level is "0" (zero). The phase difference of the lights passing through the arms 102a, 102b is different by each modulator element depending on manufacturing errors and so on, and therefore, it is necessary to adjust the phases by each modulator element.

There is a method in which an electrode for phase control is formed at least at one arm in addition to the modulating electrodes 103a, 103b, the refractive index of at least either one of the arms is changed by adjusting the voltage applied to the phase control electrode to change the phase as a method controlling the phase difference between the arms 102a, 102b. There is a method to make a difference in DC biases applied to the modulating electrodes 103a, 103b as another method controlling the phase difference between the arms 102a, 102b. Generally, in the semiconductor MZ type modulator, a modulating operation is performed by applying the DC bias at approximately several V, and it is possible to adjust the phase difference between the arms 102a, 102b by making the DC biases different between the arms 102a, 102b.

On the other hand, a phenomenon so-called as a wavelength chirp in which a wavelength of the output light changes with a modulation occurs in the MZ type optical modulator. This wavelength chirp becomes a factor deteriorating an optical modulation waveform after an optical fiber transmission. Accordingly, it is necessary to precisely control the wavelength chirp to obtain enough modulation characteristics in the MZ type optical modulator. There are a technology of a zero chirp operation in which an amount of the wavelength chirp is reduced as much as possible, and a technology of a negative chirp operation in which a wavelength chirp improving an optical waveform after transmission is intentionally added as a controlling technology of the wavelength chirp. These chirp controlling technologies are enabled by adjusting a rate of amplitudes of phase changes of the lights generated at the arms 102a, 102b when the modulating voltage signals are applied. In the zero chirp operation, it is desirable that the rate of the amplitudes of the phase changes of the lights generated at the arms 102a, 102b when the modulation signals at high-frequency voltages are applied is fixed to be 1:1. In the negative chirp operation, it is desirable that the rate of the amplitudes of the phase changes of the lights generated at one arm and the other arm is fixed to be, for example, approximately 0.85:0.15.

The above-stated rates are enabled by, for example, adjusting the rate of the amplitudes of the voltage signals applied to the arms 102a, 102b. The modulation signals of which amplitudes are the same and directions are in reverse are applied to the arms 102a, 102b to make the amounts of the phase changes generated at the arms 102a, 102b the same and make the directions in reverse to enable the zero chirp operation. For example, the modulation signals of which amplitudes are different between the arms 102a, 102b and directions are in reverse are each applied to make the one phase change amounts of the arms 102a, larger than 102b, to enable the negative chirp operation.

As stated above, in the MZ type optical modulation device, it is required to appropriately perform both the control of the phase difference between the arms 102a, 102b and the control of the rate of the amplitudes of the phase changes between the arms to obtain the fine modulation characteristics.

PATENT LITERATURE

Patent Literature 1: Japanese National Publication of International Patent Application No. 2007-531022

In recent years, a down-sizing of an optical transmitter and receiver modules by using the semiconductor MZ modulator as stated above is strongly required.

It is important not only the down-sizing of the modulator itself but also the down-sizing and simplification of a modulator module including the modulator to make the above-stated optical transmitter and receiver modules small. In this case, the method using the phase control electrode in addition to the modulating electrodes is not adequate for the down-sizing among the above-stated phase control methods, because the number of electrode pins for connection in the modulator module increases. Besides, a control parameter of the modulator increases in accordance with the addition of the phase control electrode, and therefore, there is a problem in which a configuration of a control circuit becomes complicated.

An adjustment method of the phase by applying the DC biases to the modulating electrodes is considered. In this case, it is suitable for the down-sizing and so on of a package of the semiconductor MZ type optical modulator, but there is a problem peculiar to the semiconductor MZ type modulator in which the control of the wavelength chirp is difficult as it is described below.

In the semiconductor MZ type modulator, a modulating operation is generally enabled by changing the refractive index by applying the modulation signals with reverse voltages to the optical waveguides. Here, the application of the modulation signals with the reverse voltages means that a negative bias is applied to a p-side electrode, and a positive bias is applied to an n-side electrode of the semiconductor MZ type optical modulator. Hereinafter, the application of the reverse voltages to the optical waveguides is just described as voltages are applied.

The phase change when the modulation signals are applied to the optical waveguides of the modulator is illustrated in FIG. 20A. As it is illustrated in the drawing, the phase change occurs in approximately a quadratic function relationship relative to the modulation signal in the optical waveguide. In other words, efficiency of the phase change becomes high approximately in proportion to the applied DC bias. Namely, a generated phase change amount changes depending on the applied DC bias even when the modulating voltage signals having the same amplitude are applied to the optical waveguides.

In the modulator, the phase difference is adjusted by shifting the DC biases applied to the modulating electrodes of the two arms when the phase difference is adjusted by the DC biases, but the relationship of the efficiencies of the phase changes change between the two arms if the DC biases are shifted by the reason as stated above.

In case of a modulator in which lengths of the modulating electrodes 103a, 103b are the same as illustrated in FIG. 19, the relationship between the voltages applied to the arms 102a, 102b and the phase changes is the same. A required adjustment amount of the phase difference, namely, a required difference of the DC biases is different by each semiconductor MZ optical modulator caused by the manufacturing error and so on. For example, if the required adjustment amount of the phase difference is $\Delta\phi$ in a modulator as illustrated in FIG. 20A, then the phase difference becomes an appropriate value when the DC biases applied to the arms 102a, 102b are $V_{DC1}$, $V_{DC2}$. On the other hand, the phase difference becomes an appropriate value when the required adjustment amount of the phase difference is $\Delta\phi'$, and the DC biases applied to the arms 102a, 102b are $V_{DC1}'$, $V_{DC2}'$ in another modulator.

As a result, the relationship of the efficiencies of the phase changes between the arms 102a, 102b becomes different by each modulator as illustrated in FIG. 20B. In FIG. 20B, the efficiency of the phase change means a rate of change (differential value) of the phase relative to the DC bias in FIG. 20A.

As it is described in the background, it is necessary to precisely adjust the rate of the phase change amount generated at the two arms (waveguides) to control the wavelength chirp. When the phase control is performed by the DC bias of the modulation electrodes as stated above, a displacement occurs in the efficiencies of the phase changes relative to the voltage signals between the two arms, and the rate of the amplitude of the phase change between the arms changes by each MZ optical modulator. Accordingly, it is impossible to precisely adjust the rate of the phase change amount generated at the two arms, and the fine chirp characteristics cannot be obtained.

It is also conceivable to adjust the phase change amount by changing the rate of the amplitude of the modulation signals for a degree of change of the efficiencies of the phase changes. However, in this case, a complicated drive circuit capable of generating two kinds of modulating voltage signals and independently and arbitrary adjusting the amplitudes of the two kinds of modulating voltage signals is necessary, but such a circuit is difficult to be enabled. In particular, it is almost impossible to enable the drive circuit capable of being mounted on a small optical transmitter and receiver. As stated above, it is difficult to precisely control the wavelength chirp by the phase control by using the DC bias.

Accordingly, at present, it is difficult to appropriately adjust both the phase control and the wavelength chirp with a down-sized and simple element structure without using a complicated control circuit in the semiconductor MZ optical modulator.

SUMMARY

A aspect of an optical modulation device is the optical modulation device including: a semiconductor Mach-Zehnder modulator splitting and propagating input light, and multiplexing and outputting the propagated lights, wherein the semiconductor Mach-Zehnder modulator includes: a first optical waveguide and a second optical waveguide propagating splitted lights; a first electrode applying a first modulation signal and a first DC bias to the first optical waveguide; and a second electrode applying a second modulation signal and a second DC bias to the second optical waveguide, wherein the first DC bias and the second DC bias are applied to keep a rate of a product of a length of the first electrode and the first DC bias and a product of a length of the second electrode and the second DC bias at a constant value.

An aspect of a driving method of an optical modulation device is the driving method of the optical modulation device using a semiconductor Mach-Zehnder modulator splitting and propagating input light, and multiplexing and outputting the propagated lights, wherein the optical modulation device includes: a first optical waveguide and a second optical waveguide propagating splitted lights; a first electrode applying a first modulation signal and a first DC bias to the first optical waveguide; and a second electrode applying a second modulation signal and a second DC bias to the second optical waveguide, the driving method of the optical modulation device, including: applying the first DC bias and the second DC bias to the first optical waveguide and the second optical waveguide to keep a rate of a product of a length of the first electrode and the first DC bias and a product of a length of the second electrode and the second DC bias at a constant value.

An aspect of a manufacturing method of an optical modulation device is the manufacturing method of the optical modulation device using a semiconductor Mach-Zehnder modulator splitting and propagating input light, and multiplexing and outputting the propagated lights, including: forming a first optical waveguide and a second optical waveguide propagating splitted light; and forming a first electrode applying a first modulation signal and a first DC bias to the first optical waveguide on the first optical waveguide and a second electrode applying a second modulation signal and a second DC bias to the second optical waveguide on the second optical waveguide, the manufacturing method of the optical modulation device, further including: determining the first DC bias and the second DC bias keeping a rate of a product of a length of the first electrode and the first DC bias and a product of a length of the second electrode and the second DC bias at a constant value, when the semiconductor Mach-Zehnder modulator is manufactured.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

—Basic configuration of Semiconductor Mach-Zehnder Modulator—

Figure 1:
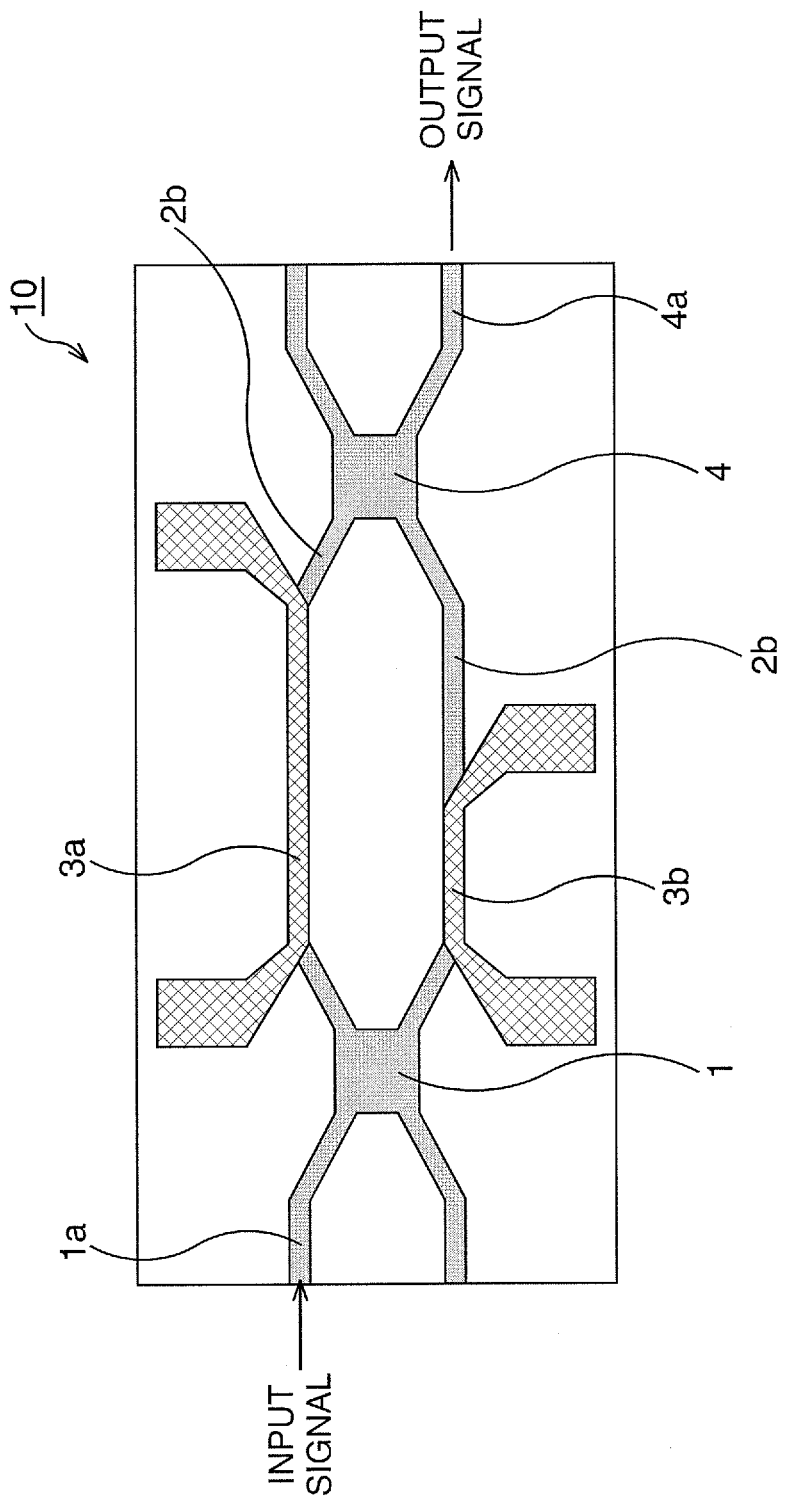
FIG. 1 is a schematic plan view illustrating a semiconductor MZ modulator used for an optical modulation device according to a first embodiment.

FIG. 1 is a schematic plan view illustrating a semiconductor Mach-Zehnder modulator used for an optical modulation device in the present embodiment.

A semiconductor MZ type modulator (modulator element) 10 is made up by semiconductor optical waveguides constituting a first optical coupler 1, arms 2a, 2b, a second optical coupler 4, and modulating electrodes 3a, 3b.

The first optical coupler 1 includes an input port 1a, and is an input coupler splitting incident light into two pieces. The arms 2a, 2b are waveguides where the two splitted lights are propagated. The modulating electrodes 3a, 3b are electrodes to respectively apply modulation signals to the arms 2a, 2b. The modulating electrode 3a and the modulating electrode 3b are formed to have different lengths as described later. The second optical coupler 4 includes an output port 4a, and is an output coupler multiplexing (coupling) the lights propagating through the arms 2a, 2b.

One ends of the two arms 2a, 2b are connected to the first optical coupler 1 and the other ends are connected to the second optical coupler 4. The light which is incident on the first optical coupler 1 from the input port 1a is splitted at the arms 2a, 2b, multiplexed by the second optical coupler 4 after each passing through the arms 2a, 2b and output from the output port 4a. On/off states of the output light are switched depending on an interference state of the light at the coupler 4. When a phase difference of the lights passing through the arms 2a, 2b at the time when they are multiplexed at the output port 4a is "0" (zero) (or 2Nπ, where "N" is an integer), it becomes in constructive interference state, and therefore, it becomes the ON state in which the light is output from the output port 4a. On the other hand, when the phase difference of the lights passing through the arms 2a, 2b at the time when they are multiplexed at the output port 4a is π (or (2N+1)π), it becomes in destructive interference state, and therefore, it becomes the OFF state in which the light is not output from the output port 4a. As stated above, the light incident from the input port 1a is output from the output port 4a while changing intensity thereof in accordance with the phase difference between the arms 2a, 2b.

A first DC bias and a first modulation signal are applied to the arm 2a from the modulating electrode 3a, and a second DC bias and a second modulation signal are applied to the arm 2b from the modulating electrode 3b to adjust the phases of the lights passing through the arms 2a, 2b.

The first DC bias and the second DC bias are applied to the arms 2a, 2b such that a rate between a product of the length of the modulating electrode 3a and the first DC bias and a product of the length of the modulating electrode 3b and the second DC bias are kept at a constant value. Here, the DC bias is a direct current bias value at an intermediate point of the ON/OFF of the modulation signal, namely, a center bias.

The phase change of the light at the semiconductor optical waveguide is approximately in proportion to a square of an applied voltage, and therefore, efficiency of the phase change relative to a voltage change increases approximately in proportion to a DC bias $V_{DC}$. Besides, the efficiency of the phase change also increases in proportion to a length L of the modulating electrode. Namely, efficiency η of the phase change is in proportion to a product of the DC bias $V_{DC}$ and the length L of the modulating electrode as described below.

$$\eta = \alpha V_{DC} L \quad \alpha: \text{proportional coefficient} \quad (1)$$

When the lengths of the modulating electrodes 3a, 3b of the arms 2a, 2b are each set to be $L_1$, $L_2$, and the DC biases applied to the modulating electrodes 3a, 3b are set to be $V_{DC1}$, $V_{DC2}$, efficiencies $\eta_1$, $\eta_2$ of the phase changes of the arms 2a, 2b are as described below. Here, the "length of the modulating electrode" means a length of a part where the modulating electrode is electrically connected to the waveguide forming the arm along a longitudinal direction of the arm. It is also the same in respective embodiments in the following.

$$\eta_1 = \alpha L_1 V_{DC1} \quad (2)$$

$$\eta_2 = \alpha L_2 V_{DC2} \quad (3)$$

Here, when the $V_{DC1}$ and the $V_{DC2}$ are fixed to a constant rate of $V_{DC1}:V_{DC2}=A:B$, a rate of the $\eta_1$ and the $\eta_2$ is as described below.

$$\eta_1:\eta_2 = AL_1:BL_2 \quad (4)$$

The lengths of the modulating electrodes 3a, 3b are determined when the modulator element 10 is manufactured, and therefore, the $L_1$, the $L_2$ are fixed values. Accordingly, when the rate of the DC biases between the two arms is fixed, the rate of the $\eta_1$ and the $\eta_2$, namely, the rate of the product of the length $L_1$ and the first DC bias $V_{DC1}$ and the product of the length $L_2$ and the second DC bias $V_{DC2}$ is fixed to a constant value.

If the $V_{DC1}$ and the $V_{DC2}$ applied to the arms 2a, 2b are increased/decreased under a state in which the rate of the first and second DC biases $V_{DC1}$, $V_{DC2}$ is fixed as stated above, it is possible to change the phase difference between the arms 2a, 2b except a case when $A:B=L_2^{1/2}:L_1^{1/2}$.

Figure 2A:
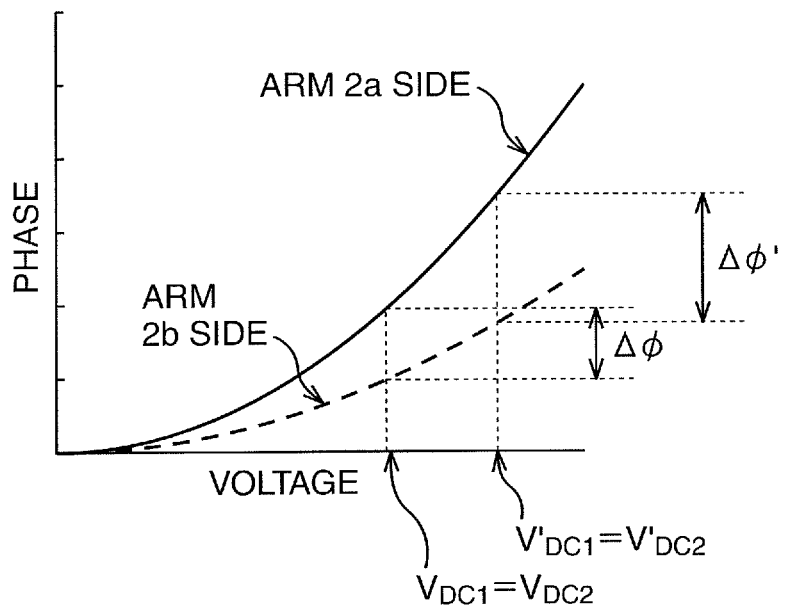
FIG. 2A is a characteristic chart representing phases relative to applied voltages when $V_{DC1}:V_{DC2}=1:1$.
Figure 2B:
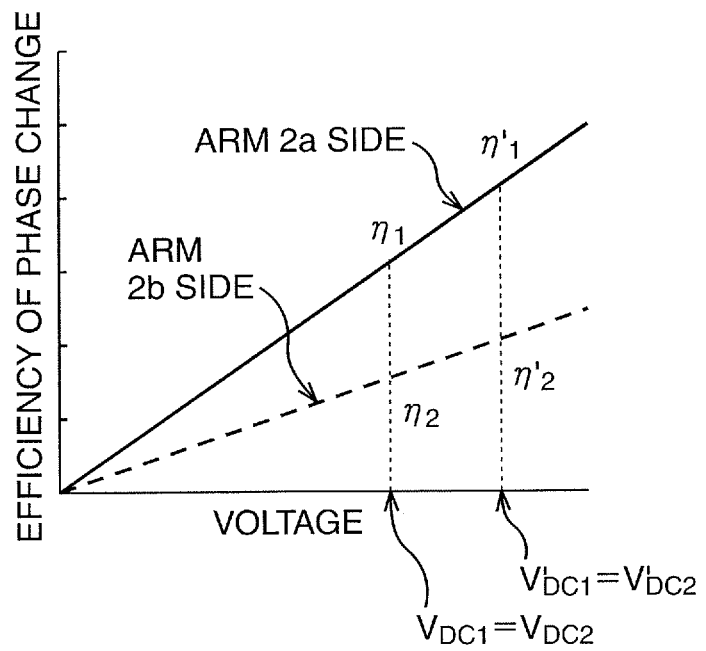
FIG. 2B is a characteristic chart representing efficiencies of phase changes relative to the applied voltages when $V_{DC1}:V_{DC2}=1:1$.
Figure 3A:
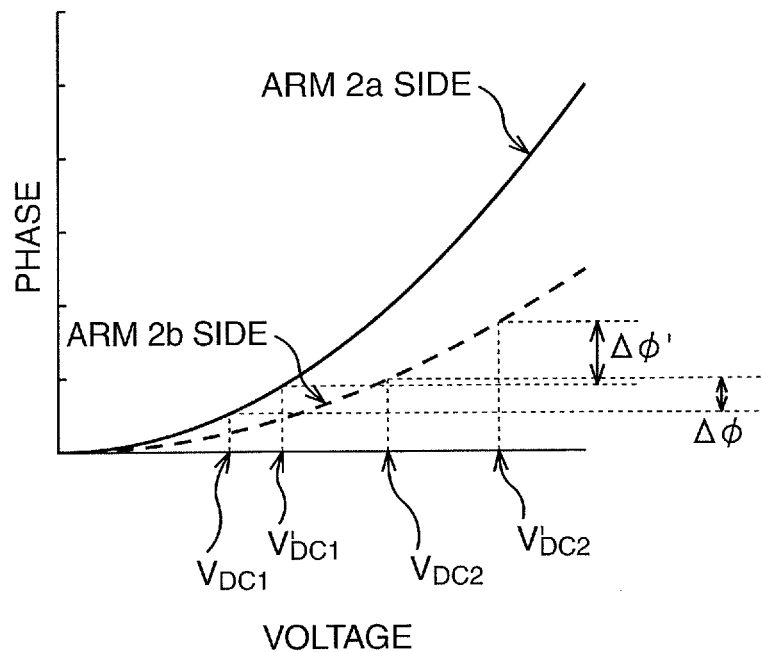
FIG. 3A is a characteristic chart representing phases relative to the applied voltages when $V_{DC1}:V_{DC2}=L_2:L_1$.
Figure 3B:
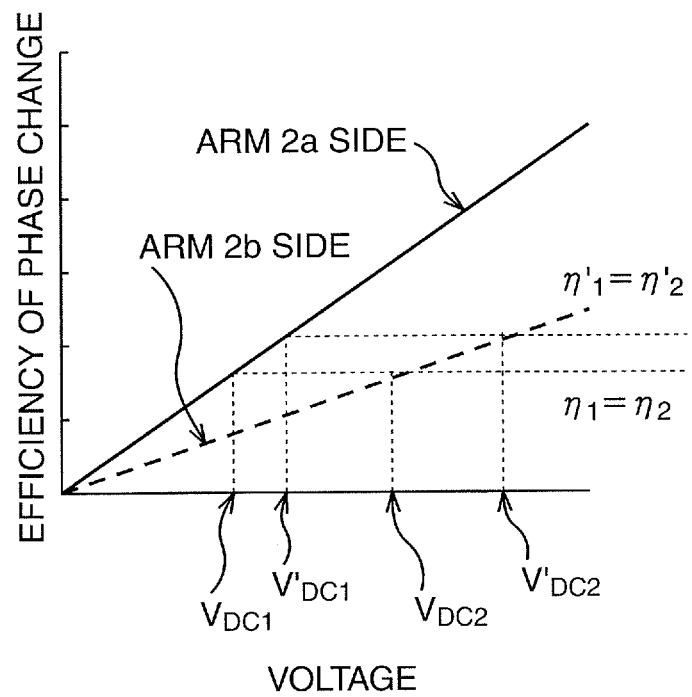
FIG. 3B is a characteristic chart representing efficiencies of phase changes relative to the applied voltages when $V_{DC1}:V_{DC2}=L_2:L_1$.

As a concrete example, the phases and the efficiencies of the phase changes when $V_{DC1}:V_{DC2}=A:B=1:1$ are represented in FIG. 2A and FIG. 2B, and the phases and the efficiencies of the phase changes when $V_{DC1}:V_{DC2}=A:B=L_2:L_1$ are represented in FIG. 3A and FIG. 3B. A value of the phase relative to the center bias is represented in FIG. 2A and FIG. 3A, and the efficiency of the phase change relative to the center bias is represented in FIG. 2B and FIG. 3B. The efficiency of the phase change is a rate of change (differential value) of the phase relative to the DC bias in FIG. 2A and FIG. 3A.

As represented in FIG. 2A, FIG. 3A, evenif the rate of the DC biases $V_{DC1}$, $V_{DC2}$ applied to the arms 2a, 2b is fixed, it is possible to make the phase difference between the arms 2a, 2b large by making the $V_{DC1}$, $V_{DC2}$ large while keeping relationship thereof.

Namely, in FIG. 2A, the phase difference between the arms 2a, 2b increases from Δφ to Δφ' when the DC biases are increased from $V_{DC1}$ (=$V_{DC2}$) to $V_{DC1}'$ (=$V_{DC2}'$) while keeping the relationship of $V_{DC1}:V_{DC2}=1:1$.

In FIG. 3A, the phase difference between the arms 2a, 2b increases from Δφ to Δφ' when the DC bias $V_{DC1}$ is increased to $V_{DC1}'$, and the DC bias $V_{DC2}$ is increased to $V_{DC2}'$ while keeping the relationship of $V_{DC1}:V_{DC2}=L_2:L_1$.

The efficiency of the phase change is considered.

A case when it is set at $V_{DC1}:V_{DC2}=1:1$ in the modulator element 10 is considered. In this case, the rate $\eta_1:\eta_2$ of the efficiencies of the phase changes generated at the arms 2a, 2b is fixed to the rate $L_1:L_2$ of the lengths of the modulating electrodes 3a, 3b of from the expression (4). Namely, the rate of the efficiencies of the phase changes is constant as $\eta_1:\eta_2=\eta_1':\eta_2'=L_1:L_2$ even when the DC bias is increased from $V_{DC1}$ (=$V_{DC2}$) to $V_{DC1}'$ (=$V_{DC2}'$) while keeping the relationship of $V_{DC1}:V_{DC2}=1:1$ as represented in FIG. 2B.

For the appropriate chirp control of the semiconductor modulator, at first, the modulating electrodes 3a, 3b are formed such that the lengths $L_1$, $L_2$ thereof become the rate of the phase change amount (the efficiency of the phase change) suitable for obtaining optimum chirp characteristics. The first modulation signal and the second modulation signal having the same amplitude are applied to the arms 2a, 2b by the modulating electrodes 3a, 3b under the DC Bias condition as stated above. Then, the appropriate chirp characteristics can be obtained. In particular, when the modulating electrodes 3a, 3b are formed such that the rate $L_1:L_2$ is at approximately 1:4 to 1:5, it is possible to obtain the chirp characteristics equivalent to chirp characteristics of a negative chirp operation (α parameter=−0.7) in an LN-MZ type optical modulation device.

In the modulator element 10, a case when the rate of the DC biases applied to the modulating electrodes 3a, 3b is set to be in reverse to the rate of the lengths of the modulating electrodes 3a, 3b, namely, it is set to $V_{DC1}:V_{DC2}=L_2:L_1$ is considered. In this case, it is possible to set the rate $\eta_1:\eta_2$ of the efficiencies of the phase changes between the arms 2a, 2b to be 1:1. Namely, the rate of the efficiencies of the phase changes is constant as $\eta_1:\eta_2\eta_1':\eta_2'=1:1$ from the expression (4) even when the DC bias $V_{DC1}$ is increased to $V_{DC1}'$, and the DC bias $V_{DC2}$ is increased to $V_{DC2}'$ while keeping the relationship of $V_{DC1}:V_{DC2}=L_2:L_1$ as represented in FIG. 3B.

The first and second modulation signals having the same amplitude are applied to the arms 2a, 2b by the modulating electrodes 3a, 3b under the DC Bias condition as stated above. It is thereby possible to enable a zero chirp operation with chirp characteristics ($\alpha$ parameter≈"0" (zero)) having little wavelength chirp.

The optimum chirp characteristics can be obtained by setting the amplitudes of the first and second modulation signals applied to the modulating electrodes 3a, 3b at the same value, and therefore, it is possible to use a simple drive circuit.

As stated above, in the optical modulation device using the semiconductor Mach-Zehnder modulator according to the present embodiment, it is possible to adjust the phase difference between the arms 2a, 2b under a state in which the rate of the efficiencies of the phase changes between the arms 2a, 2b is fixed constant. As a result, it is possible to perform both the adjustment of the phase difference between the arms 2a, 2b and the precise control of the chirp characteristics. Besides, when the optical modulation device is driven, the DC biases applied to the modulating electrodes 3a, 3b are just to be adjusted to adjust the phase difference. Accordingly, it is not necessary to provide an additional phase control electrode, and the down-sizing of the modulator and the modulator module is enabled.//

—Concrete Embodiments—

Hereinafter, concrete embodiments are described in detail with reference to the drawings.

First Embodiment

Figure 4A:
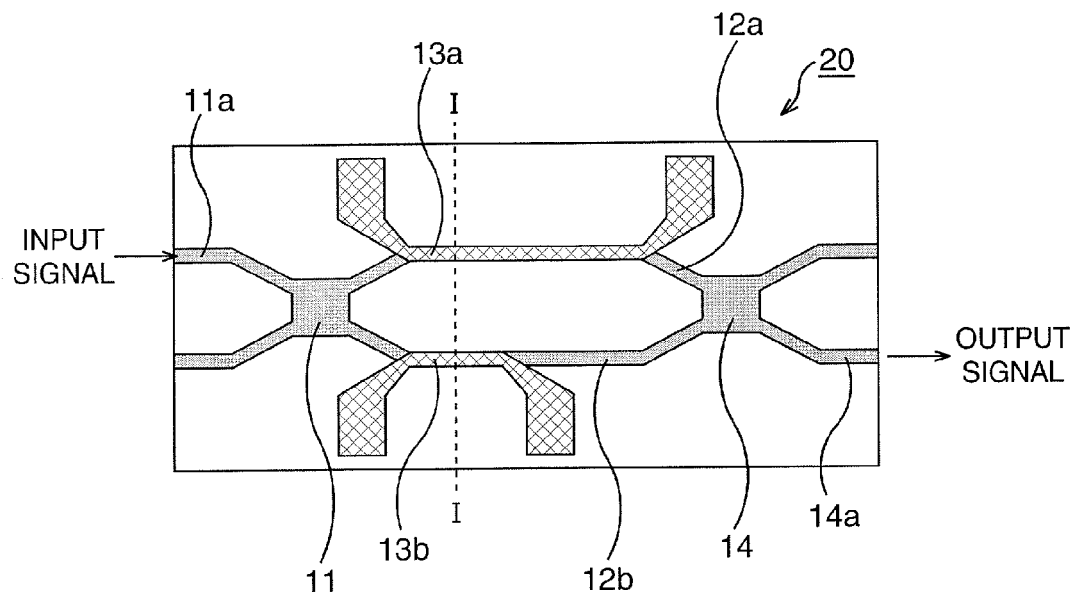
FIG. 4A is a schematic plan view illustrating a semiconductor MZ modulator used for the optical modulation device according to the first embodiment.
Figure 4B:
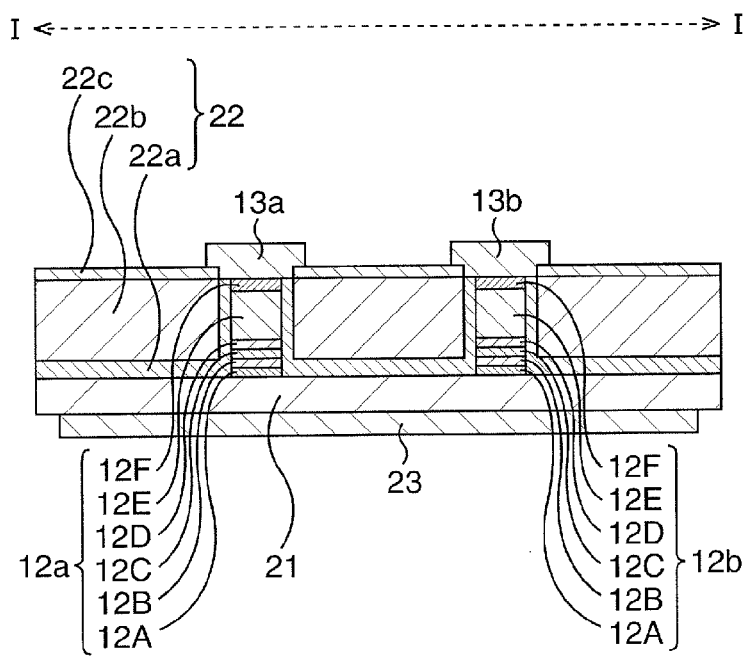
FIG. 4B is a schematic sectional view illustrating the semiconductor MZ modulator used for the optical modulation device according to the first embodiment.

FIG. 4A and FIG. 4B are schematic views illustrating a semiconductor Mach-Zehnder modulator used for an optical modulation device in a first embodiment, in which FIG. 4A is a plan view, and FIG. 4B is a sectional view along a dotted line I-I in FIG. 4A.

Figure 5:
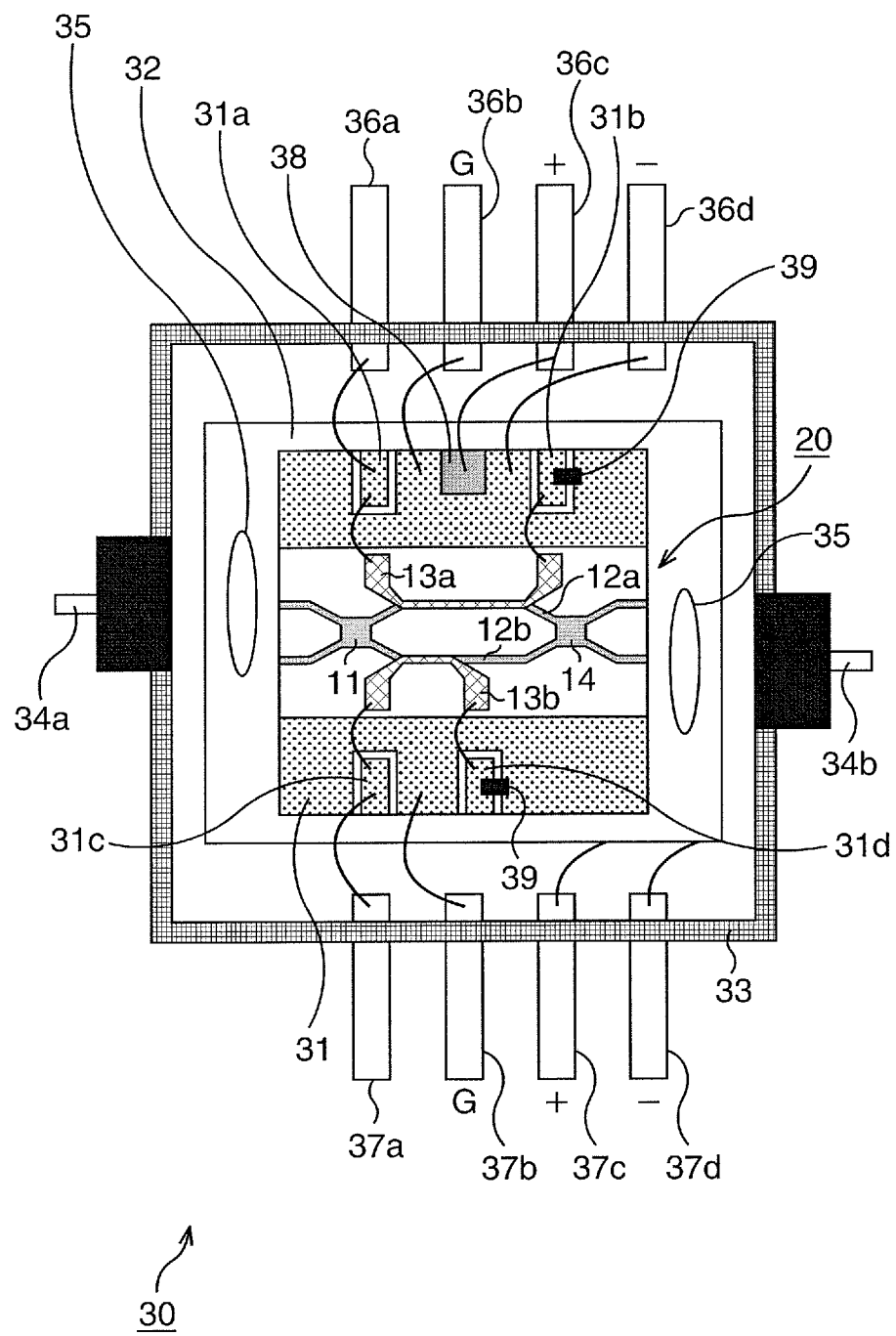
FIG. 5 is a schematic plan view illustrating a modulator module mounting the semiconductor MZ modulator in FIG. 4A and FIG. 4B.

FIG. 5 is a schematic plan view illustrating a modulator module mounting the semiconductor Mach-Zehnder modulator in FIG. 4.

Figure 6:
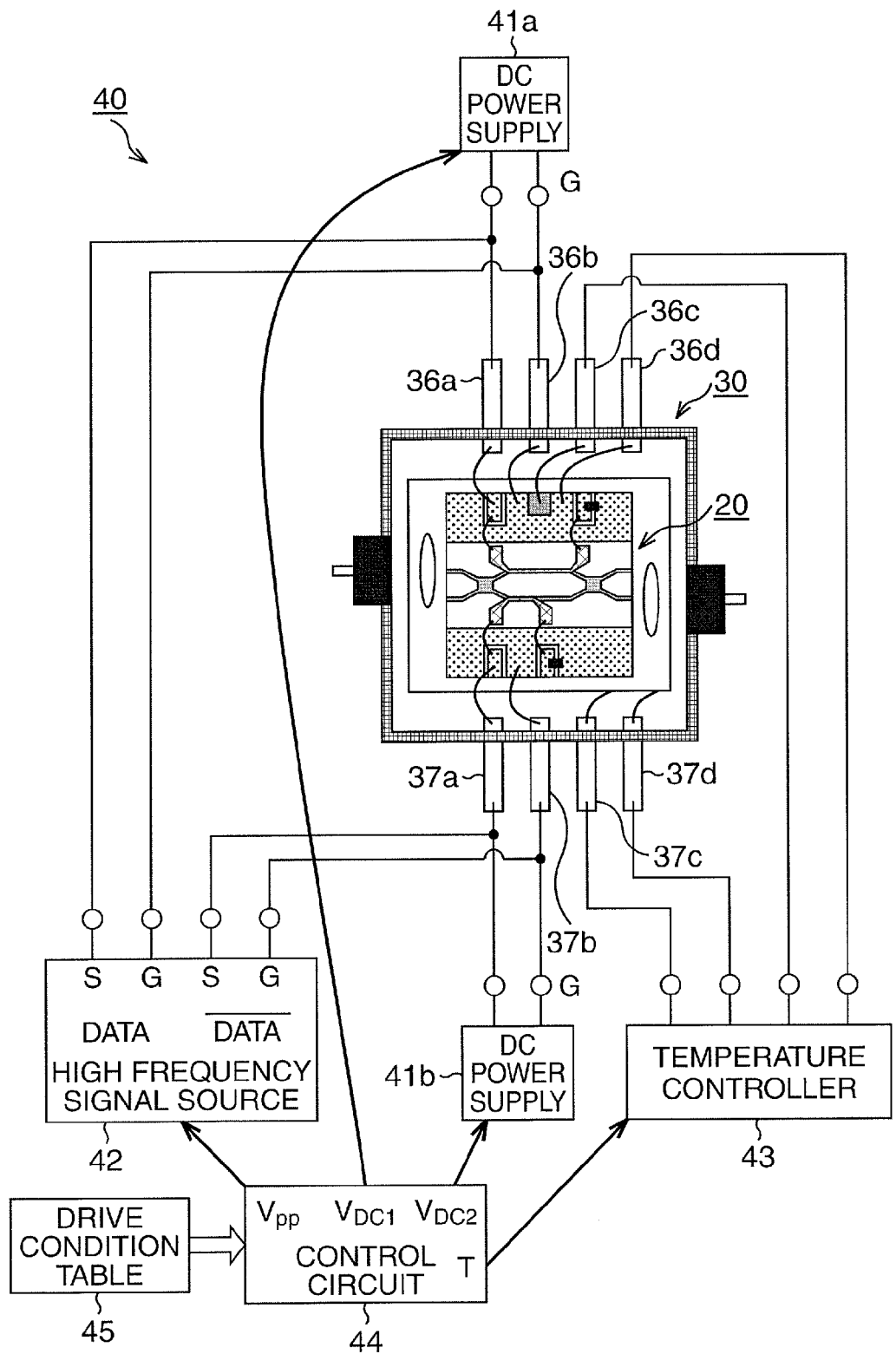
FIG. 6 is a schematic plan view illustrating the optical modulation device mounting the modulator module in FIG. 5.

FIG. 6 is a schematic plan view illustrating an optical modulation device mounting the modulator module in FIG. 5.

A semiconductor Mach-Zehnder modulator (modulator element) 20 used for the optical modulation device (optical transmitter) according to the present embodiment is made up by semiconductor waveguide including a first optical coupler 11, arms 12a, 12b, and a second optical coupler 14, and modulating electrodes 13a, 13b as illustrated in FIG. 4A.

The first optical coupler 11 includes an input port 11a, and is so-called a 2×2 MMI coupler splitting incident light into two pieces. The arms 12a, 12b are optical waveguides in which the two splitted lights are propagated. The modulating electrodes 13a, 13b are formed on the optical waveguides of the arms 12a, 12b, and are electrodes to apply a first modulation signal and a second modulation signal to the arms 12a, 12b. The modulating electrodes 13a, 13b are formed in so-called a traveling wave type microstrip line structure having a part where the modulation signal is input and a part where the modulation signal is output. The modulating electrode 13a and the modulating electrode 13b are formed to have different lengths as described later. The second optical coupler 14 includes an output port 14a, and is a 2×2 MMI coupler multiplexing (coupling) the lights propagating the arms 12a, 12b.

Note that the modulating electrodes 13a, 13b are not limited to the microstrip line structure. For example, a coplanar electrode structure in which a ground electrode is formed in parallel to the modulating electrode at an upper surface, a lumped constant type electrode, and so on may be used.

One ends of the two arms 12a, 12b are connected to the first optical coupler 11, and the other ends are connected to the second optical coupler 14. The light incident from the input port 11a to the first optical coupler 11 is splitted at the arms 12a, 12b, multiplexed at the second optical coupler 14 after they pass through the arms 12a, 12b, and output from the output port 14a. On/off states of output light are switched depending on an interference state of the light at the multiplexer. When a phase difference of the lights passing through the arms 12a, 12b and coupling again at the output port 14a is "0" (zero) (or 2N$\pi$, where "N" is an integer), it becomes in the constructive interference state, and therefore, it becomes the ON state in which the light is output from the output port 14a. On the other hand, when the phase difference of the lights passing through the arms 12a, 12b and coupling again at the output port 14a is $\pi$ (or (2N+1)$\pi$), it becomes in the destructive interference state, and therefore, it becomes the OFF state in which the light is not output from the output port 14a. As stated above, the light incident from the input port 11a is output from the output port 14a while changing the intensity thereof in accordance with the phase difference of the arms 12a, 12b.

In the modulator element 20, the optical waveguide constituting the first coupler 11, the arms 12a, 12b, and the second optical coupler 14 are formed on a surface of an n-InP substrate 21 as illustrated in FIG. 4A, FIG. 4B, and an insulating layer 22 is formed to cover a side surface of the optical waveguide. The modulating electrodes 13a, 13b are formed on the arms 12a, 12b. A common ground electrode 23 is formed at a rear surface of the n-InP substrate 21.

The arms 12a, 12b are formed as semiconductor optical waveguides in a mesa structure as illustrated in FIG. 4B. Here, an n-InP cladding layer 12A, an i-InP layer 12B, an InGaAsP-MQW (Multiple-Quantum Well) core layer 12C, an i-InP layer 12D, a p-InP cladding layer 12E, and an p-InGaAsP contact layer 12F are sequentially stacked and formed on the n-InP substrate 21. The InGaAsP-MQW core layer 12C is made up by, for example, stacking the InGaAsP layer and the InP layer in plural with each other.

The insulating layer 22 includes an SiO$_2$ film 22a formed from on the n-InP substrate 21 to the side surfaces of the arms 12a, 12b, a low dielectric resin film 22b formed on the SiO$_2$ film 22a, and an SiO$_2$ film 22c formed on the low dielectric resin film 22b. The SiO$_2$ films 22a, 22c function as passivation films. The low dielectric resin film 22b is formed by using, for example, benzocyclobutene (BCB) and so on as a material.

A summary of a manufacturing process of the semiconductor Mach-Zehnder modulator is described in the following.

At first, respective layers of the semiconductor of 12A to 12F as illustrated in FIG. 4B are deposited on the n-InP substrate 21 by using, for example, a general MOCVD method. After that, a mask of SiO$_2$ and so on covering only a part where the first optical coupler 11, the arms 12a, 12b, and the second optical coupler 14, and the input port 11a, the output port 14a are formed, is formed by a general lithography technology using a resist and a dry etching. The dry etching is performed for the respective layers 12A to 12F by using this mask. The arms 12a, 12b and so on in the mesa structure are thereby formed.

Subsequently, the insulating layer 22 is formed at a whole surface by a CVD method and so on after the mask is removed. The insulating layer 22 only on the arms 12a, 12b is removed by the general lithography technology using the resist and the dry etching to form openings.

After that, for example, the modulating electrodes 13a, 13b connected to the arms 12a, 12b are formed in the openings by using, for example, a vapor deposition of Ti/Pt/Au and a gold plating.

Note that in the present embodiment, the InGaAsP based MQW core layer 12C is used as the optical waveguide core layer, but it is not limited thereto, and for example, the other semiconductor MQW core layers such as an AlGaInAs based MQW core layer may be used.

In the semiconductor Mach-Zehnder modulator having the above-stated constitution, the first DC bias and the first modulation signal are applied to the arm 12a from the modulating electrode 13a, and the second DC bias and the second modulation signal are applied to the arm 12b from the modulating electrode 13b to adjust the phases of the lights passing through the arms 12a, 12b.

The first DC bias and the second DC bias are applied to the arms 12a, 12b under a state in which the rate of the product of the length of the modulating electrode 13a and the first DC bias and the product of the length of the modulating electrode 13b and the second DC bias is kept at a constant value.

In the present embodiment, the DC biases having the same value (center biases) and the first modulation signal and the second modulation signal having the same amplitude and of which voltage changes are in reverse from one another are applied to the modulating electrodes 13a, 13b. Under this condition, the rate of the efficiencies of the phase changes between the arms 12a, 12b is fixed at the rate of the lengths of the modulating electrodes 13a, 13b. Accordingly, the rate of the modulating electrode lengths is appropriately set, and thereby, the rate of the phase change amounts between two arms can be appropriately adjusted, and the fine negative chirp operation can be enabled.

In detail, they become as stated below. The modulating electrode 13a is formed to have the length $L_1$=1.5 mm, and the modulating electrode 13b is formed to have the length $L_2$=0.3 mm. The rate of $V_{DC1}$:$V_{DC2}$ is fixed to be 1:1. Accordingly, the rate $\eta_1$:$\eta_2$ of the efficiencies of the phase changes at the arms 2a, 2b is fixed to the following value.

$$\eta_1:\eta_2 = L_1 V_{DC1} : L_2 V_{DC2} = L_1 : L_2 = 1.5 : 0.3 = 5 : 1$$

As stated above (as represented in FIG. 2A, FIG. 2B), it is possible to change and adjust the phase difference between the arms 12a, 12b by increasing/decreasing the DC biases of both the arms 12a, 12b while matching the DC biases of the modulating electrodes 13a, 13b.

As illustrated in FIG. 5, an optical modulation module 30 is made up by using the modulator element 20 constituted as stated above.

The modulator element 20 is bonded on a carrier 31. The carrier 31 mounting the modulator element 20 is disposed on a temperature adjusting element, for example, a Peltier element 32. The Peltier element 32 mounting the carrier 31 is packaged in a module package 33, and the optical modulator module 30 is thereby constituted.

Electrodes 31a, 31b, 31c, 31d are patterned, and a thermistor 38 monitoring a temperature of the modulator element 20 is provided at the carrier 31. The electrode 31a is, for example, wire bonded to one end of the modulating electrode 13a and the electrode 31b is wire bonded to the other end of the modulating electrode 13a. A terminating resistor 39 with, for example, 50Ω connected to the carrier 31 is disposed at the electrode 31b. The electrode 31c is, for example, wire bonded to one end of the modulating electrode 13b and the electrode 31d is wire bonded to the other end of the modulating electrode 13b. The terminating resistor 39 connected to the carrier 31 is disposed at the electrode 31d.

Collimating lenses 35 are each disposed at backward and forward of the modulator element 20. Optical fibers with lenses 34a, 34b condensing the light to be collimated light by the collimating lenses 35 are disposed at the module package 33. The light from the optical fiber 34a is coupled to the modulator element 20, and the light output by passing through the modulator element 20 is coupled to the optical fiber 34b. Otherwise, the light from the optical fiber 34b may be coupled to the modulator element 20, and the light output by passing through the modulator element 20 may be coupled to the optical fiber 34a to the contrary.

Electrode pins 36a, 36b, 36c, 36d, 37a, 37b, 37c, 37d to drive the modulator element 20 are provided at the module package 33. The electrode pin 36a is wire bonded to the electrode 31a. The electrode pin 36a is electrically connected to one end of the modulating electrode 13a via the electrode 31a on the carrier 31. The electrode pin 36b is wire bonded to the ground pattern of the carrier 31, and functions as a ground electrode. The electrode pin 36c and the electrode pin 36d are each wire bonded to the thermistor 38 and the ground pattern of the carrier 31. The electrode pin 37a is wire bonded to the electrode 31c. The electrode pin 37a is electrically connected to one end of the modulating electrode 13b via the electrode 31c on the carrier 31. The electrode pin 37b is wire bonded to the ground pattern of the carrier 31 and functions as the ground electrode. The electrode pins 37c, 37d are wire bonded to the Peltier element 32 each to be a positive electrode and a negative electrode.

As illustrated in FIG. 6, an optical modulation device 40 is made up by using the optical modulator module 30 constituted as stated above.

A DC power supply 41a and a high-frequency signal source 42 are connected to the electrode pins 36a, 36b. A DC power supply 41b and the high-frequency signal source 42 are connected to the electrode pins 37a, 37b. A temperature controller 43 is connected to the electrode pins 36c, 36d, 37c, 37d. A control circuit 44 controlling the DC power supplies 41a, 41b, the high-frequency signal source 42 and the temperature controller 43 in accordance with each condition of a later-described drive condition table 45 is provided, and the optical modulation device 40 is constituted. The drive condition table 45 is created at a manufacturing stage of the MZ type optical modulation device, and stored at a predetermined memory and so on.

The DC power supply 41a applies the first DC bias $V_{DC1}$ described at the drive condition table 45 between the electrode pins 36a, 36b under the control of the control circuit 44. The high-frequency signal source 42 applies the first modulation signal being the high-frequency signal having an amplitude $V_{PP}$ described at the drive condition table 45 between the electrode pins 36a, 36b under the control of the control circuit 44.

The DC power supply 41b applies the second DC bias $V_{DC2}$ described at the drive condition table 45 between the electrode pins 37a, 37b under the control of the control circuit 44. The high-frequency signal source 42 applies the second modulation signal being the high-frequency signal having the amplitude $V_{PP}$ described at the drive condition table 45 between the electrode pins 37a, 37b under the control of the control circuit 44.

The first DC bias $V_{DC1}$ and the first modulation signal are applied to the modulating electrode 13a and the second DC bias $V_{DC2}$ and the second modulation signal are applied to the modulating electrode 13b by the DC power supplies 41a, 41b and the high-frequency signal source 42. The first modulation signal and the second modulation signal are the modulation signals having the same amplitude and of which voltage changes are in reverse from one another.

The temperature controller 43 measures a resistance at the thermistor 38, observes the temperature of the modulator element 20, and adjusts a current applyed to the Peltier element 32 based on the observed temperature to adjust the temperature of the modulator element 20. The temperature controller 43 adjusts such that the modulator element 20 is to be a drive temperature T described at the drive condition table 45 by the control of the control circuit 44.

Figure 7:
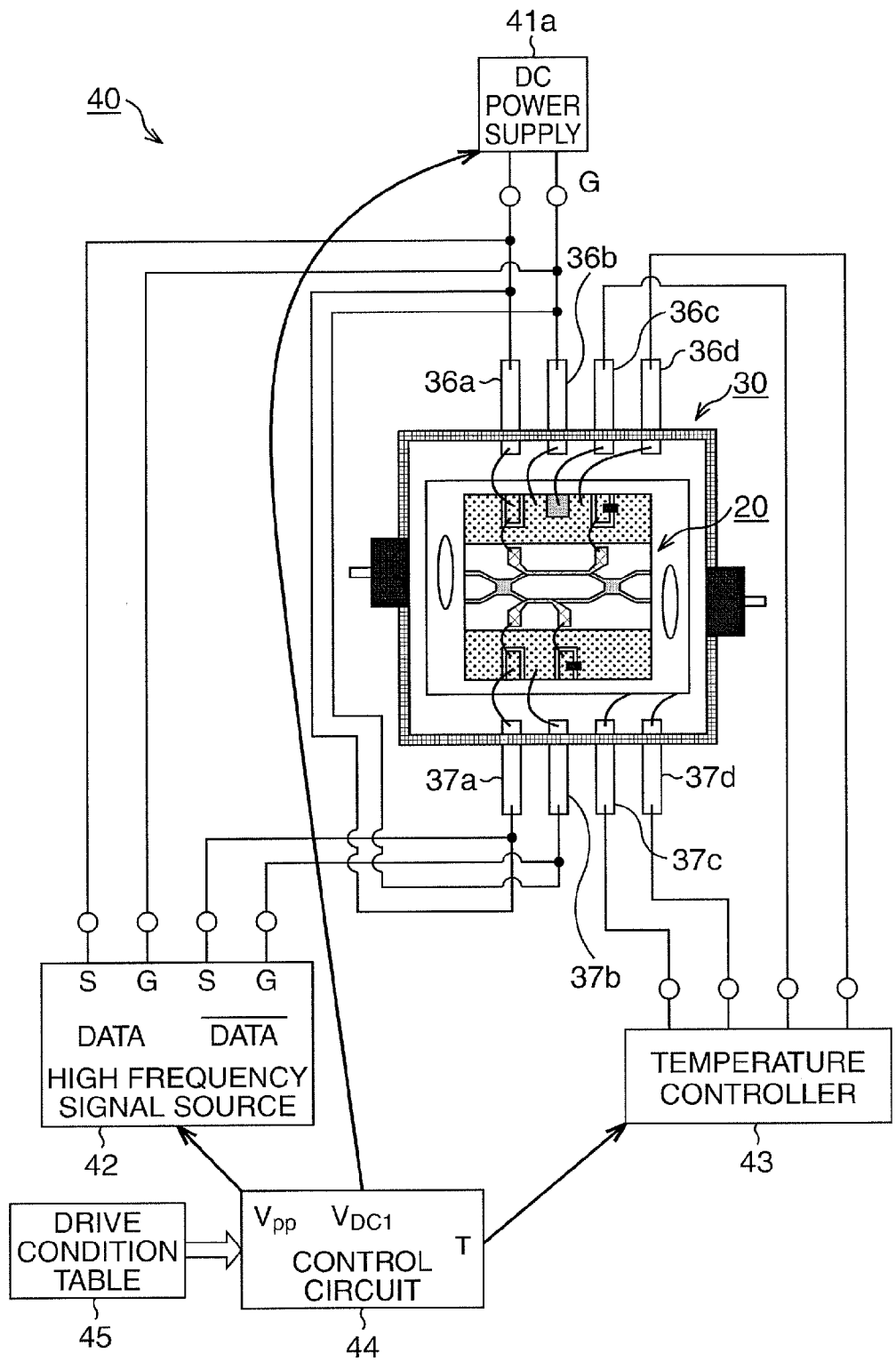
FIG. 7 is a schematic plan view illustrating another example of the optical modulation device according to the first embodiment.

In the present embodiment, the first DC bias $V_{DC1}$ and the second DC bias $V_{DC2}$ are set to be the same value under the control of the control circuit 44 based at the drive condition table 45. Accordingly, as illustrated in FIG. 7, the DC power supply 41b may not be provided, and only the DC power supply 41a is provided. In this case, the DC power supply 41a is connected to the electrode pins 36a, 36b and the electrode pins 37a, 37b. The DC power supply 41a applies a DC bias $V_{DC}$ described at the drive condition table 45 between the electrode pins 36a, 36b and between the electrode pins 37a, 37b under the control of the control circuit 44. At this time, the DC biases $V_{DC}$ at the same value are applied to the modulating electrodes 13a, 13b.

Figure 8:
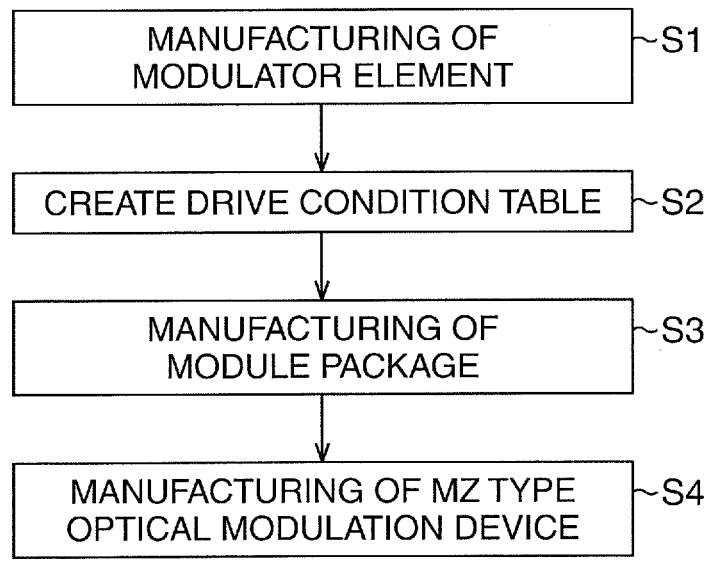
FIG. 8 is a flowchart illustrating a manufacturing method of the optical modulation device according to the first embodiment in process sequence.

Hereinafter, a manufacturing method of the optical modulation device 40 is described. FIG. 8 is a flowchart illustrating the manufacturing method of the optical modulation device 40 in process sequence.

At first, manufacturing of a modulator element is performed (step S1). A process of the step S1 is as illustrated in the above, and it is not described here.

Next, a property evaluation of the semiconductor Mach-Zehnder modulator to create the drive condition table 45 is performed, and the drive condition table 45 is created (step S2).

The drive temperature T of the modulator element 20, the first DC bias $V_{DC1}$, the second DC bias $V_{DC2}$ (in the present embodiment, $V_{DC1}=V_{DC2}$), the amplitude $V_{PP}$ of the high-frequency signal are described at the drive condition table 45. The $V_{DC1}$, the $V_{DC2}$, the $V_{PP}$ are values in which the fine modulation operation can be performed under a state in which the modulator element 20 is adjusted to be the drive temperature T.

Next, the optical modulator module 30 is manufactured (step S3).

As illustrated in FIG. 6, the modulator element is bonded on the carrier 31, the carrier 31 is disposed on the Peltier element 32, and the Peltier element 32 is packaged in the module package 33.

Note that the step S2 creating the drive condition table 45 may be performed after the optical modulator module 30 is manufactured at this step S3.

After that, the optical modulation device is manufactured (step S4).

As illustrated in FIG. 7, the DC power supplies 41a, 41b, the high-frequency signal source 42, the temperature controller 43 are each connected, and the control circuit 44 is connected to the optical modulator module 30. The memory to which the drive condition table 45 is stored is connected to the control circuit 44.

Hereinafter, the step S2 creating the drive condition table 45 is described in detail.

A case when the first and second modulation signals of which voltage changes are in reverse from one another are applied to the modulating electrodes 13a, 13b of the arms 12a, 12b as in the present embodiment is considered. In this case, it is necessary to appropriately adjust a phase difference between arms 1 and 2 so as to perform a fine modulation operation in which high extinction ratio can be achieved. Namely, a signal level of the light is set at ON level when the first modulation signal applied to the modulating electrode 13a is at ON level (at a higher voltage level) and the second modulation signal applied to the modulating electrode 13b is at OFF level (at a lower voltage level). Conversely, the signal level of the light is set at OFF level when the first modulation signal is at OFF level and the second modulation signal is at ON level.

In the semiconductor Mach-Zehnder modulator according to the present embodiment, for example, when an input port of light is set to be 11a, and an output port is set to be 14a, the light is output from the output port 14a in case a phase difference when the lights passing through the arms 12a, 12b are multiplexed at the output port 14a is "0" (zero) (or $2N\pi$, where "N" is an integer). Accordingly, the signal level of the light is at ON level. In case when the phase difference when the lights passing through the arms 12a, 12b are multiplexed at the output port 14a is $\pi$ (or $(2N+1)\pi$), the light is output from the opposite port of 14a and is hardly output from the output port 14a. Accordingly, the signal level of the light is at OFF level.

Accordingly, it is necessary to adjust the phase difference between the arms 12a, 12b such that the phase difference becomes $2N\pi$ when the first modulation signal is at ON level and the second modulation signal is at OFF level. In other words, it can be said that it is necessary to set the phase difference to be $(2N+1)\pi$ when the first modulation signal is at OFF level and the second modulation signal is at ON level. It can be said in other words that at the center bias being the center value between the ON level and the OFF level of the first and second modulation signals, the phase difference is necessary to be set at approximately $(2N+0.5)\pi$.

When the modulator element 20 using the 2×2 MMI as the input/output couplers as in the present embodiment is ideally manufactured, the phase difference of the lights passing through the arms 12a, 12b becomes "0" (zero) under a state in which the voltages are not applied to the modulating electrodes 13a, 13b when the input port is set to be 11a and the output port is set to be 14a.

However, in actual, the phase difference is not accurately "0" (zero) but have a finite value $\Delta\theta$ caused by manufacturing errors and so on. This value $\Delta\theta$ is generated by the manufacturing errors and so on, and therefore, the respective modulator elements 20 have different values even if the modulator elements 20 with the same specification are manufactured. Accordingly, it is necessary to take the initial phase difference between the arms 12a, 12b caused by the manufacturing errors into consideration to set the phase difference between the arms 12a, 12b at $(2N+0.5)\pi$ by using the DC bias (center bias). Namely, it is necessary to set the amount of the phase difference between the arms 12a, 12b generated by applying the DC biases at $(2N+0.5)\pi-\Delta\theta$.

Figure 9:
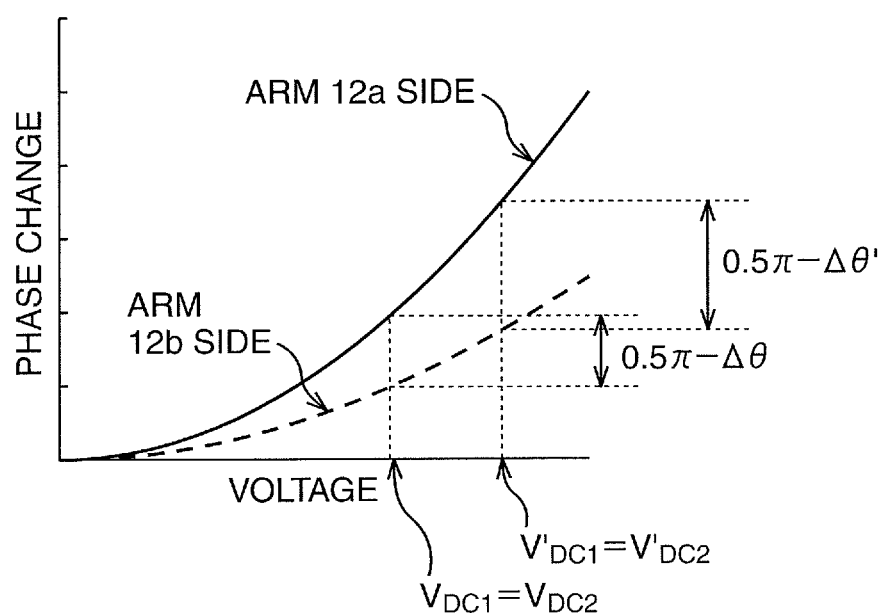
FIG. 9 is a characteristic chart representing phases and efficiencies of phase changes when $V_{DC1}:V_{DC2}=A:B=1:1$ in the first embodiment.

A diagram rewriting FIG. 2 to describe the driving method adjusting the phase difference by increasing/decreasing the DC biases is illustrated in FIG. 9.

In the present embodiment, the DC biases are increased/decreased under a state in which the DC biases are matched between the arms 12a, 12b, but the phase change amounts generated at the arms 12a, 12b are different even if the same voltages are applied thereto because the lengths of the modulating electrodes 13a, 13b are different. As a result, the phase difference between the arms 12a, 12b changes by increasing/decreasing the value of the center bias. The phase difference between the arms 12a, 12b becomes large as the DC biases of the both arms are made large. Accordingly, it becomes possible to appropriately adjust the phase difference between the arms 12a, 12b if the DC biases are applied to the modulating electrodes 13a, 13b up to a "$V_{DC1}(=V_{DC2})$" in which the phase difference becomes, for example, $0.5\pi-\Delta\theta$. Besides, when the initial phase difference is, for example, $\Delta\theta'$ at another modulator element 20, the DC biases of the arms 12a, 12b are to be set at "$V'_{DC1}(=V'_{DC2})$" in FIG. 9 so that the phase difference becomes a value of $0.5\pi-\Delta\theta'$.

As stated above, the values of $\Delta\theta$ are different by each modulator element 20, and therefore, the necessary values of the DC biases are different by each modulator element 20. It is possible to fix the rate of the phase change amounts generated at the arms 12a, 12b when the DC biases at the modulating electrodes 13a, 13b are matched as in the present embodiment evenif the value of DC biases itself changes. Accordingly, the characteristics of the wavelength chirp hardly change. As a result, it is possible to enable both the appropriate control of the phase difference between the arms 12a, 12b and the precise control of the wavelength chirp, and the fine modulation characteristics can be obtained at the modulator element 20.

The adjustment of the phase difference by the DC biases according to the present embodiment can be considered in principle as stated above, but when it is actually adjusted, it is difficult to directly observe the phase change of each arm. Accordingly, the phase difference is adjusted according to the following procedure at the step S1, and the drive condition table of the DC biases is created in the present embodiment.

Figure 10:
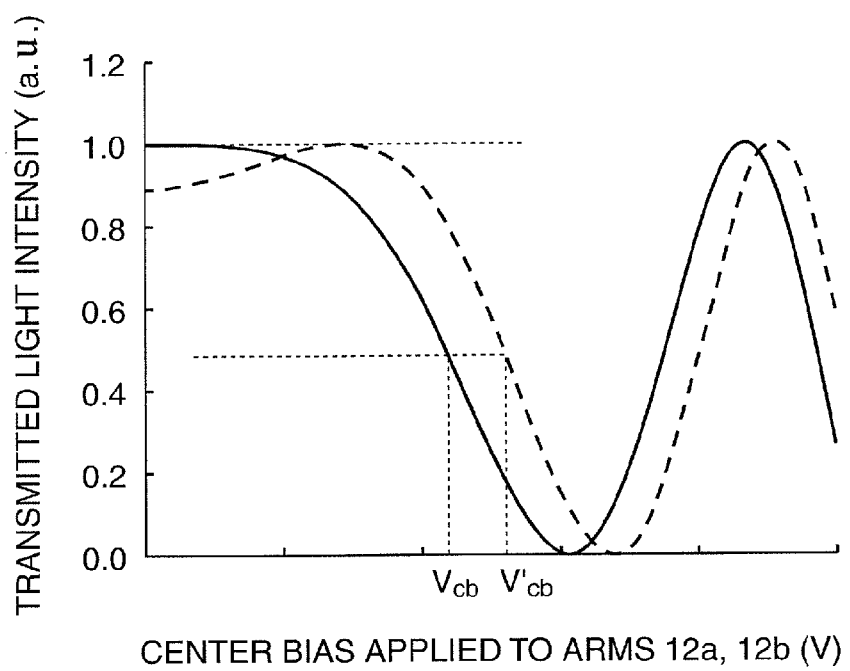
FIG. 10 is a characteristic chart representing an extinction curve used when a phase difference is adjusted in the first embodiment.

The first DC bias (or the second DC bias) is changed (swept) from "0" (zero) V to several V under the state in which the first DC bias and the second DC bias applied to the modulating electrodes 13a, 13b are matched. In this case, for example, so-called the extinction curve as illustrated in FIG. 10 is obtained if the light intensity output from the output port (in this case, the output port 14a) is observed. This extinction curve represents that the interference state is changed by the phase difference between the arms and the output light intensity changes, and the phase difference between the arms 12a, 12b is $2N\pi$ at a maximum part, and is $(2N+1)\pi$ at a minimum part. The phase difference between the arms 12a, 12b becomes $(2N+0.5)\pi$ when a center bias $V_{cb}$ being an intermediate point between the maximum and the minimum is applied. Accordingly, the first DC bias applied to the arm 12a is matched with the center bias $V_{cb}$, and thereby, the above-stated phase adjustment is performed. In the present embodiment, the first DC bias applied to the arm 12a and the second DC bias applied to the arm 12b are the same value, and therefore, the second DC bias applied to the arm 12b is also set to be the center bias $V_{cb}$.

Note that the extinction curve becomes the maximum value when the bias is "0" (zero) as a solid line in FIG. 10 when the initial phase difference between the arms 12a, 12b is "0" (zero) if the modulator element 20 of the present embodiment is ideally manufactured. When there is the manufacturing error in the modulator element 20 and there is an initial phase difference caused by the manufacturing error, the extinction curve shifts in a horizontal axis direction as a dotted line in FIG. 10, and the extinction curve has a peek at a position other than the position where the bias is "0" (zero).

Accordingly, when the modulator element 20 is ideally manufactured as the solid line, the DC bias applied to the arm 12a is set to be a value of the center bias $V_{cb}$ in FIG. 10. When there is the initial phase difference between the arms 12a, 12b as the dotted line, the first DC bias $V_{DC1}$ applied to the arm 12a is set to be a value of a center bias $V_{cb}'$ in FIG. 10. As stated above, the center bias to be the intermediate point between the maximum and the minimum changes depending on the initial phase difference generated depending on manufacturing variance of the modulator element 20, and therefore, the DC bias in which the phase is appropriately adjusted is different depending on the modulator element 20.

It is difficult to perform the adjustment while actually performing the modulation operation as for the adjustment of the phase difference by evaluation of the extinction curve as stated above. Accordingly, in the present embodiment, the evaluation of the extinction curve as illustrated in FIG. 10 is performed at the manufacturing stage of the modulator element 20 (or the optical modulator module 30), and the first and second DC biases $V_{DC1}$, $V_{DC2}$ (in the present embodiment, $V_{DC1}=V_{DC2}$) are determined in advance under the drive temperature T. The determined $V_{DC1}$, $V_{DC2}$ are described at the drive condition table 45 together with the drive temperature T.

In general, deterioration over time of the phase change of the waveguide when the voltage is applied is extremely small in the semiconductor waveguide. Accordingly, the drive condition table is created at the manufacturing stage as stated above, and the modulator element 20 is driven based on the table, then it is possible to semi-permanently keep the fine modulation operation.

In general, it is desirable that the MZ type optical modulator is operable at, for example, a whole area of a C-band of a communication wavelength band. In the MZ type optical modulator, the characteristics are different by each wavelength resulting from a wavelength dependency of the phase change amount when the voltages are applied to the semiconductor optical waveguides. As a result, the condition of the DC bias in which the phase is matched in optimum as stated above is different by each wavelength. Accordingly, it is basically necessary to separately evaluate the condition of the DC bias by each wavelength. The DC bias of which phase matches has a relatively simple relationship relative to the wavelength, and therefore, the evaluations of the extinction curves are performed at several wavelengths, to find an optimum value of the DC bias, and the DC bias may be found by a complement as for the wavelength between the evaluated wavelengths based on the result. For example, the adjustment of the DC biases by the evaluations of the extinction curves as stated above may be performed in three wavelengths of edges at a high-frequency side and a low-frequency side and at a center of the C-band. The DC bias at the wavelength between the adjusted wavelengths is linearly complemented or complemented by using a relationship in which a relationship between the DC bias and the wavelength is fit by a quadratic function, and so on, and thereby, the conditions of the DC bias at all of the wavelengths may be found.

At the step S1, the amplitude ($V_{pp}$) of the first and second modulation signals is determined in advance such that the enough extinction ratio can be achieved under the condition in which the first and second DC biases $V_{DC1}$, $V_{DC2}$ are set at the center bias $V_{cb}$ found at each wavelength as stated above. Then the determined Vpp is described at the drive condition table 45.

The adjustment of the amplitude of the first and second modulation signals may be performed by determining the $V_{pp}$ large enough to secure the enough extinction ratio by observing, for example, an eye pattern of a modulation waveform. Optimum values of the $V_{pp}$ are also different by each wavelength in the modulator element 20. In this case, the optimum amplitudes $V_{pp}$ are experimentally found at several wavelengths as same as the determination of the first and second DC biases $V_{DC1}$, $V_{DC2}$, and the wavelength in-between may be complemented by a simple relationship.

Figure 11:
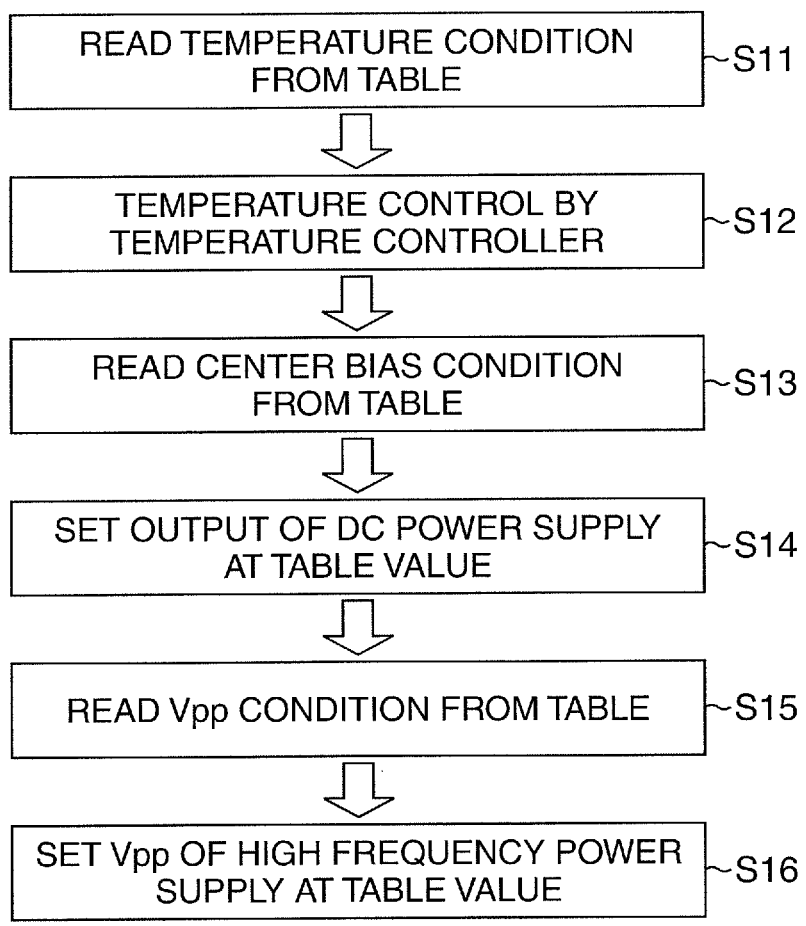
FIG. 11 is a flowchart illustrating a driving method of an MZ type optical modulation device according to the first embodiment.

Hereinafter, a driving method of the optical modulation device according to the present embodiment is described based at the drive condition table created as stated above. FIG. 11 is a flowchart illustrating the driving method of the optical modulation device according to the first embodiment.

At first, the control circuit 44 reads the drive temperature T of the modulator element 20 from the drive condition table 45 (step S11).

Next, the temperature controller 43 adjusts the temperature of the modulator element 20 at a constant drive temperature T (for example, at 25° C.) (step S12).

Next, the control circuit 44 reads the first and second DC biases $V_{DC1}$, $V_{DC2}$ applied to the arms 12a, 12b from the drive condition table 45 (step S13).

Next, the DC power supplies 41a, 41b apply the read first and second DC biases $V_{DC1}$, $V_{DC2}$ to the modulating electrodes 13a, 13b of the arms 12a, 12b via the electrode pins 36a, 36b and the electrode pins 37a, 37b by the control of the control circuit 44 (step S14).

Next, the control circuit 44 reads the amplitude $V_{pp}$ of the high-frequency signal from the drive condition table 45 (step S15).

Next, the high-frequency signal source 42 applies the first and second modulation signals being the high-frequency signals having the read amplitude $V_{pp}$ and of which voltage changes are in reverse from one another to the modulating electrodes 13a, 13b of the arms 12a, 12b via the electrode pins 36a, 36b and the electrode pins 37a, 37b under the control of the control circuit 44 (step S16).

It becomes possible to perform the fine modulation operation at the modulator element 20 by the above-stated procedure.

In the present embodiment, a case when the 2×2 MMI couplers are used as the input side and output side optical couplers is described as a structure of the modulator element 20, but it is not limited to the structure.

The one capable of splitting the input light into two pieces can be used as the optical coupler at the input side, and the one coupling the lights incident from the two arms can be used as the optical coupler at the output side. For example, the effect can similarly be obtained by a 1×2 MMI coupler, a Y-branch coupler, an optical coupler using a directional coupler, or the like. Note that the ideal phase differences generated when the DC bias is not applied at all are different depending on a combination of the used optical couplers, and therefore, it is necessary to adjust the DC bias according to the ideal phase difference. For example, when the 1×2 MMI coupler is used at the input side, and the 2×2 MMI coupler is used at the output side, the ideal phase difference between arms when the voltages are not applied to the modulating electrodes becomes $0.57\pi$. Accordingly, the required phase adjustment amount is considered to be only for the initial phase difference generated by the manufacturing errors and so on.

As described above, according to the present embodiment, it is possible to enable the optimum control of the phase difference between the arms 12a, 12b and the precise control of the wavelength chirp characteristics with a simple element constitution, and the optical modulation in which the device size is small and having the fine characteristics is enabled.

Second Embodiment

In the present embodiment, an optical modulation device using the semiconductor Mach-Zehnder modulator is an object as same as the first embodiment, but they are different in a point in which modulation modes are different.

In the optical modulation device according to the present embodiment, the configurations of the semiconductor Mach-Zehnder modulator, the optical modulator module, and the optical modulation device are almost the same as the first embodiment. Accordingly, the drawings and the reference numerals and symbols of the first embodiment are also appropriately used to describe in the present embodiment.

When the modulation operation is performed by changing the phases of the lights passing through the arms 12a, 12b, the first DC bias and the first modulation signal are applied to the arm 12a from the modulating electrode 13a, and the second DC bias and the second modulation signal are applied to the arm 12b from the modulating electrode 13b.

The first DC bias and the second DC bias are applied to the arms 12a, 12b such that the rate of the product of the length of the modulating electrode 13a and the first DC bias and the product of the length of the modulating electrode 13b and the second DC bias is kept at a constant value.

In the present embodiment, the first DC bias $V_{DC1}$ applied to the modulating electrode 13a and the second DC bias $V_{DC2}$ applied to the modulating electrode 13b are fixed to be $V_{DC1}$: $V_{DC2}=L_2:L_1$. Under this condition, the first modulation signal and the second modulation signal having the same amplitude and of which voltage change directions are in reverse from one another are applied to the modulating electrodes 13a, 13b. The phase changes generated at the arms 12a, 12b by the modulation signals are in reverse directions from one another for approximately the same amount, and the fine zero chirp operation can be enabled.

In detail, they are as described below. The modulating electrode 13a is formed to have the length $L_1=1.5$ mm, the modulating electrode 13b is formed to have the length $L_2=0.5$ mm. The rate of $V_{DC1}:V_{DC2}$ is fixed to be 1:3. Accordingly, the rate $\eta_1:\eta_2$ of efficiencies of the phase changes at the arms 12a, 12b is fixed to the following value.

$$\eta_1:\eta_2 = L_1 V_{DC1}:L_2 V_{DC2} = 1.5 \times 1:0.5 \times 3 = 1:1.$$

Namely, the efficiencies of the phase changes at the arms 12a, 12b become the same value.

Similar to the first embodiment, the first and second DC biases applied to the arms 12a, 12b are increased/decreased while fixing the relationship of the first DC bias $V_{DC1}$: the second DC bias $V_{DC2}$ to 1:3, and thereby, it is possible to change and adjust the phase difference between the arms 12a, 12b.

Similar to the first embodiment, the phase difference becomes large as the first and second DC biases are made large, and therefore, it is possible to adjust the phase difference between the arms 12a, 12b in optimum.

In the present embodiment, the phase difference is adjusted by the procedure as stated below when the drive condition table is created at the step S2 in FIG. 8 of the first embodiment.

Figure 12:
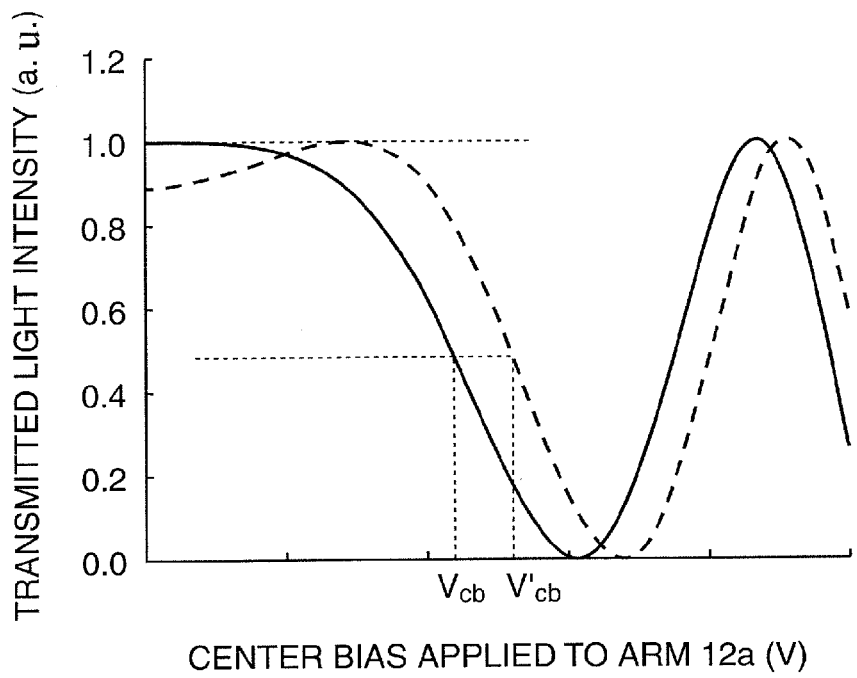
FIG. 12 is a characteristic chart representing an extinction curve used when a phase difference is adjusted in a second embodiment.

The first DC bias is changed from "0" (zero) V to several V under a state in which the relationship between the first and second DC biases $V_{DC1}$, $V_{DC2}$ applied to the modulating electrodes 13a, 13b is fixed to 1:3. In this case, for example, the extinction curve as illustrated in FIG. 12 is obtained when the intensity of light output from the output port (in this case, the output port 14a) is observed. Similar to the first embodiment, the first DC bias applied to the arm 12a is matched with the center bias $V_{cb}$ in FIG. 12, and thereby, the above-stated phase adjustment is performed. In the present embodiment, the relationship between the first and second DC biases $V_{DC1}$, $V_{DC2}$ applied to the modulating electrodes 13a, 13b is fixed to 1:3, and therefore, the second DC bias applied to the arm 12b is set to be a value of $V_{cb} \times 3$.

Note that this extinction curve becomes the maximum value when the bias is "0" (zero) as the solid line in FIG. 12 when the initial phase difference between the arms 12a, 12b is "0" (zero) if the modulator element 20 is ideally manufactured. When there is the manufacturing error in the modulator element 20 and there is the initial phase difference generated by the manufacturing error, the extinction curve shifts in the horizontal axis direction as the dotted line in FIG. 12, and it has a peek at a position other than the position where the bias is "0" (zero).

Accordingly, when the modulator element 20 is ideally manufactured as the solid line, the first DC bias applied to the arm 12a is set to be a value of the center bias $V_{cb}$ in FIG. 12. When the initial phase difference exists between the arms 12a, 12b as the dotted line, the first DC bias $V_{DC1}$ applied to the arm 12a is set to be a value of a center bias $V_{cb}'$ in FIG. 12. As stated above, the center bias to be the intermediate point between the maximum and the minimum varies depending on the initial phase difference generated depending on the manufacturing variance of the modulator element 20, and therefore, the DC bias of which phase is appropriately adjusted is different by each modulator element 20.

The first and second DC biases $V_{DC1}$, $V_{DC2}$ determined as stated above (in the present embodiment, $V_{DC2} = 3V_{DC1}$) are described at the drive condition table together with the amplitude $V_{pp}$ of the first and second modulation signals and the drive temperature T.

The driving method of the optical modulation device according to the present embodiment is as same as FIG. 11 in the first embodiment. Namely, the drive temperature T is read from the drive condition table to perform the temperature adjustment, the $V_{DC1}$, $V_{DC2}$ are read to be applied to the modulating electrodes 13a, 13b, and the amplitude $V_{pp}$ is read to apply the high-frequency signals of which voltage changes are in reverse from one another.

As described above, according to the present embodiment, it is possible to enable the optimum control of the phase difference between the arms 12a, 12b and the precise control of the wavelength chirp characteristics with the simple element constitution, and the optical modulation of which device size is small and having the fine characteristics is enabled.

Third Embodiment

In the present embodiment, an optical modulation device using the semiconductor Mach-Zehnder modulator is an object as same as the first embodiment, but they are different in a point in which modulation modes are different.

In the optical modulation device according to the present embodiment, the configurations of the semiconductor Mach-Zehnder modulator, the optical modulator module, and the optical modulation device are almost the same as the first embodiment. Accordingly, the drawings and the reference numerals and symbols of the first embodiment are also appropriately used to describe in the present embodiment.//

When the modulation operation is performed by changing the phases of the lights passing through the arms 12a, 12b, the first DC bias and the first modulation signal are applied to the arm 12a from the modulating electrode 13a, and the second DC bias and the second modulation signal are applied to the arm 12b from the modulating electrode 13b.

The first DC bias and the second DC bias are applied to the arms 12a, 12b such that the rate of the product of the length of the modulating electrode 13a and the first DC bias and the product of the length of the modulating electrode 13b and the second DC bias is kept at a constant value. In the present embodiment, the above-stated rate at the first and second modulation signals is kept to be, for example, 5:1 to enable a desired negative chirp program operation.

In the present embodiment, the modulating electrodes 13a, 13b are formed such that the rate of the length $L_1$ of the modulating electrode 13a and the length $L_2$ of the modulating electrode 13b becomes 2:1. Specifically, the modulating electrode 13a is formed to have the length $L_1 = 1.5$ mm, the modulating electrode 13b is formed to have the length $L_2 = 0.75$ mm. In the first DC bias $V_{DC1}$ applied to the modulating electrode 13a and the second DC bias $V_{DC2}$ applied to the modulating electrode 13b, $V_{DC1} : V_{DC2}$ is fixed to be 2.5:1. The first modulation signal and the second modulation signal having the same amplitude and of which voltage change directions are in reverse from one another are applied to the modulating electrodes 13a, 13b under the condition.

The rate $\eta_1 : \eta_2$ of efficiencies of the phase changes at the arms 12a, 12b is fixed to the following value.

$$\eta_1 : \eta_2 = L_1 V_{DC1} : L_2 V_{DC2} = 1.5 \times 2.5 : 0.75 \times 1 = 5:1$$

The phase changes are thereby generated at the arms 12a, 12b at the rate of 5:1 in the reverse direction from one another, and a fine negative chirp operation can be enabled.

Figure 13:
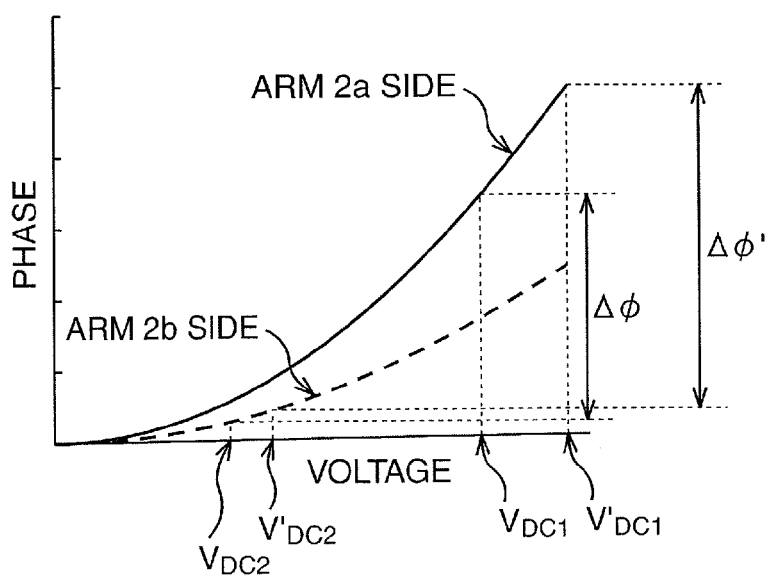
FIG. 13 is a characteristic chart representing phases and efficiencies of phase changes when $V_{DC1}:V_{DC2}=2.5:1$ in a third embodiment.

As illustrated in FIG. 13, the first and second DC biases applied to the arms 12a, 12b are increased/decreased while fixing the relationship between the first DC bias $V_{DC1}$: the second DC bias $V_{DC2}$ to 2.5:1, and thereby, it is possible to change and adjust the phase difference between the arms 12a, 12b. In FIG. 13, the phase difference between the arms 12a, 12b becomes $\Delta\phi$ when the first and second DC biases are $V_{DC1}$, $V_{DC2}$, and the phase difference becomes $\Delta\phi'$ when they are $V_{DC1}'$, $V_{DC2}'$.

Similar to the first embodiment, the phase difference becomes large as the first and second DC biases are made large, and therefore, it is possible to adjust the phase difference between the arms 12a, 12b in optimum.

In the present embodiment, the phase difference is adjusted by the procedure as stated below when the drive condition table is created at the step S2 in FIG. 8 of the first embodiment.

Figure 14:
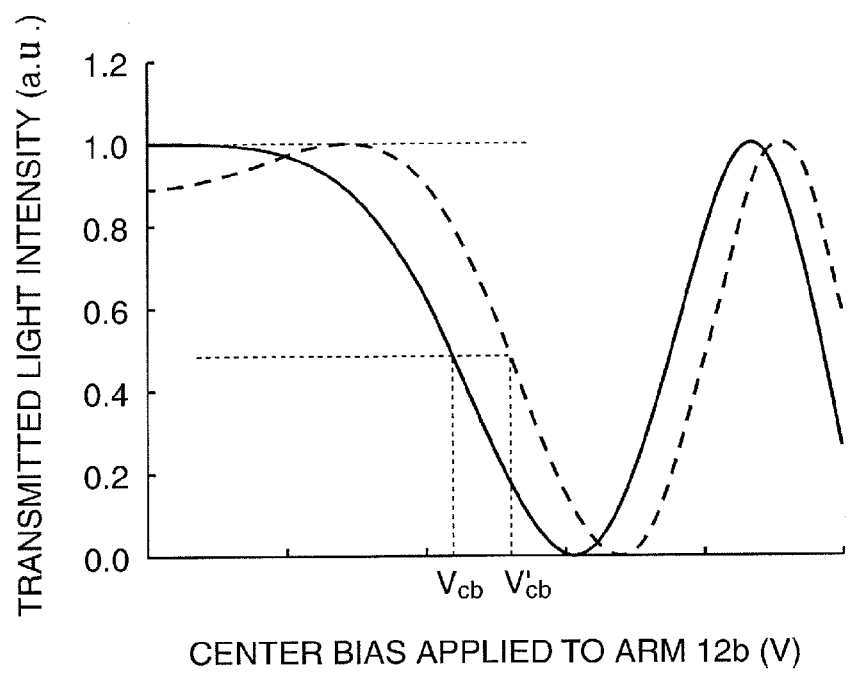
FIG. 14 is a characteristic chart representing an extinction curve used when a phase difference is adjusted in the third embodiment.

The second DC bias is changed from "0" (zero) V to several V under a state in which the relationship between the first and second DC biases $V_{DC1}$, $V_{DC2}$ applied to the modulating electrodes 13a, 13b is fixed to 2.5:1. In this case, for example, the extinction curve as illustrated in FIG. 14 is obtained when the intensity of light output from the output port (in this case, the output port 14a) is observed. The second DC bias applied to the arm 12b is matched with the center bias $V_{cb}$ in FIG. 14, and thereby, the above-stated phase adjustment is performed. In the present embodiment, the relationship between the first and second DC biases $V_{DC1}$, $V_{DC2}$ applied to the modulating electrodes 13a, 13b is fixed to be 2.5:1, and therefore, the first DC bias applied to the arm 12a is set to be a value of $V_{cb} \times 2.5$.

Note that this extinction curve becomes the maximum value when the bias is "0" (zero) as the solid line in FIG. 14 when the initial phase difference between the arms 12a, 12b is "0" (zero) if the modulator element 20 is ideally manufactured. When there is the manufacturing error in the modulator element 20 and there is the initial phase difference generated caused thereby, the extinction curve shifts in the horizontal axis direction as the dotted line in FIG. 14, and it has a peek at a position other than the position where the bias is "0" (zero).

Accordingly, when the modulator element 20 is ideally manufactured as the solid line, the second DC bias applied to the arm 12b is set to be the value of the center bias $V_{cb}$ in FIG. 14. When the initial phase difference exists between the arms 12a, 12b as the dotted line, the second DC bias $V_{DC2}$ applied to the arm 12b is set to be a value of the center bias $V_{cb}$' in FIG. 14. As stated above, the center bias to be the intermediate point between the maximum and the minimum varies by the initial phase difference generated depending on the manufacturing variance of the modulator element 20, and therefore, the DC bias of which phase is appropriately adjusted is different by each modulator element 20.

The first and second DC biases $V_{DC1}$, $V_{DC2}$ determined as stated above (in the p-resent embodiment, $V_{DC1}=2.5V_{DC2}$) are described at the drive condition table together with the amplitude $V_{pp}$ of the first and second modulation signals and the drive temperature T.

The driving method of the MZ type optical modulation device according to the present embodiment is as same as FIG. 11 in the first embodiment. Namely, the drive temperature T is read from the drive condition table to perform the temperature adjustment, the $V_{DC1}$, $V_{DC2}$ are read to be applied to the modulating electrodes 13a, 13b, and the amplitude $V_{pp}$ is read to apply the high-frequency signals of which voltage changes are in reverse from one another.

As described above, according to the present embodiment, it is possible to enable the optimum control of the phase difference between the arms 12a, 12b and the precise control of the wavelength chirp characteristics with the simple element constitution, and the optical modulation of which device size is small and having the fine characteristics is enabled.

Fourth Embodiment

Figure 15:
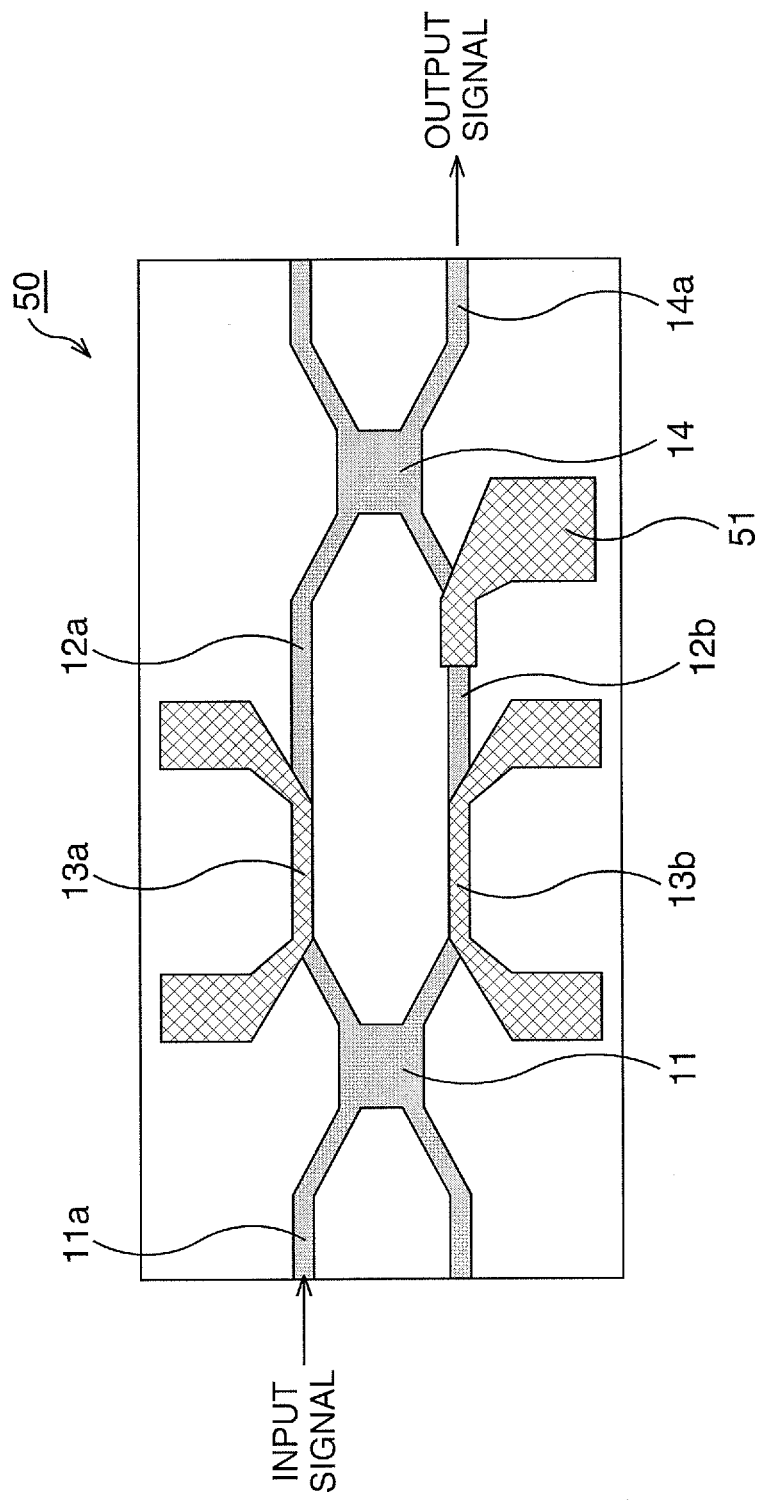
FIG. 15 is a schematic plan view illustrating a semiconductor Mach-Zehnder modulator used for an optical modulation device according to a fourth embodiment.

FIG. 15 is a schematic plan view illustrating a semiconductor Mach-Zehnder modulator used for an optical modulation device according to a fourth embodiment.

Figure 16:
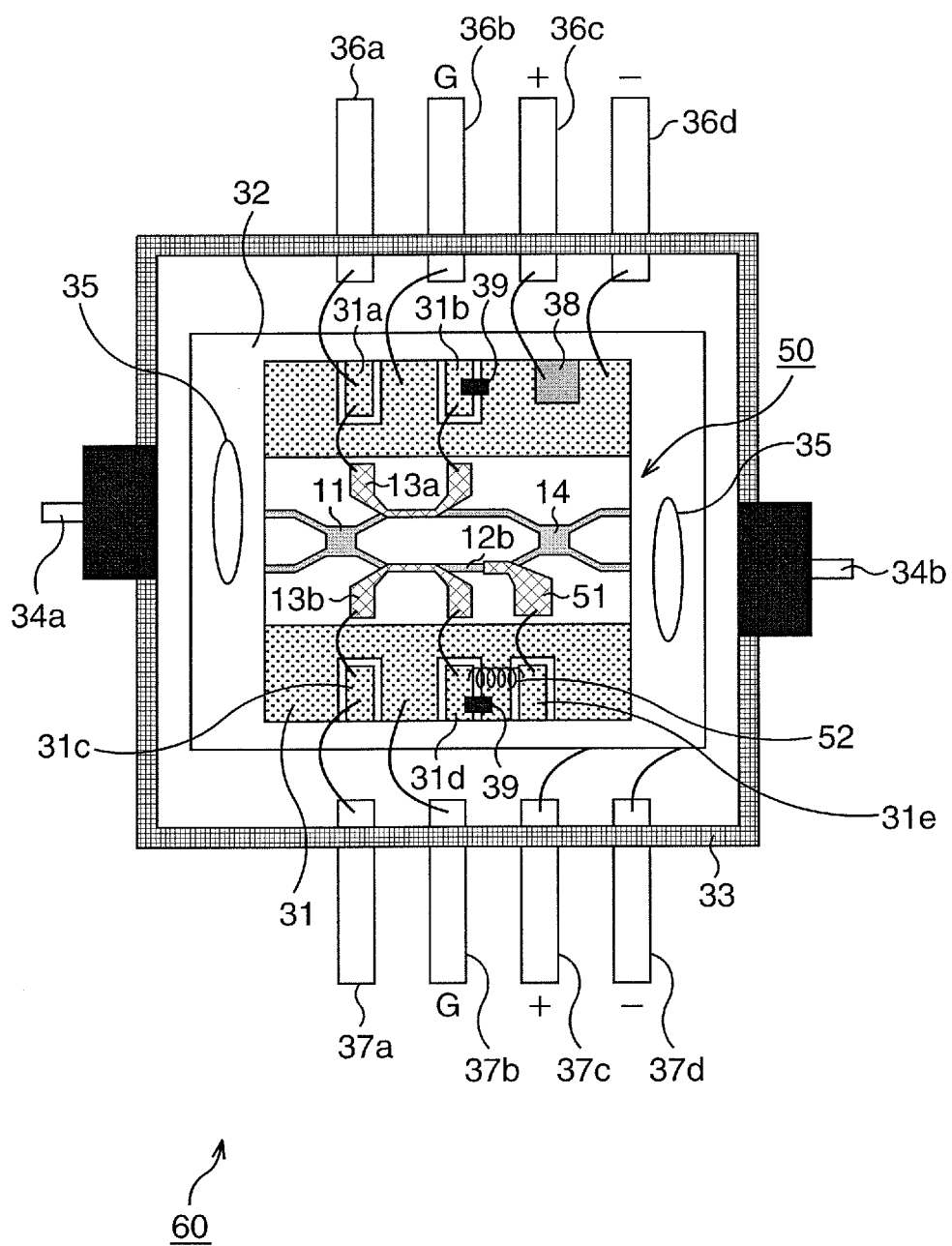
FIG. 16 is a schematic plan view illustrating a modulator module mounting the semiconductor Mach-Zehnder modulator in FIG. 15.

FIG. 16 is a schematic plan view illustrating a modulator module mounting the semiconductor Mach-Zehnder modulator in FIG. 15.

Figure 17:
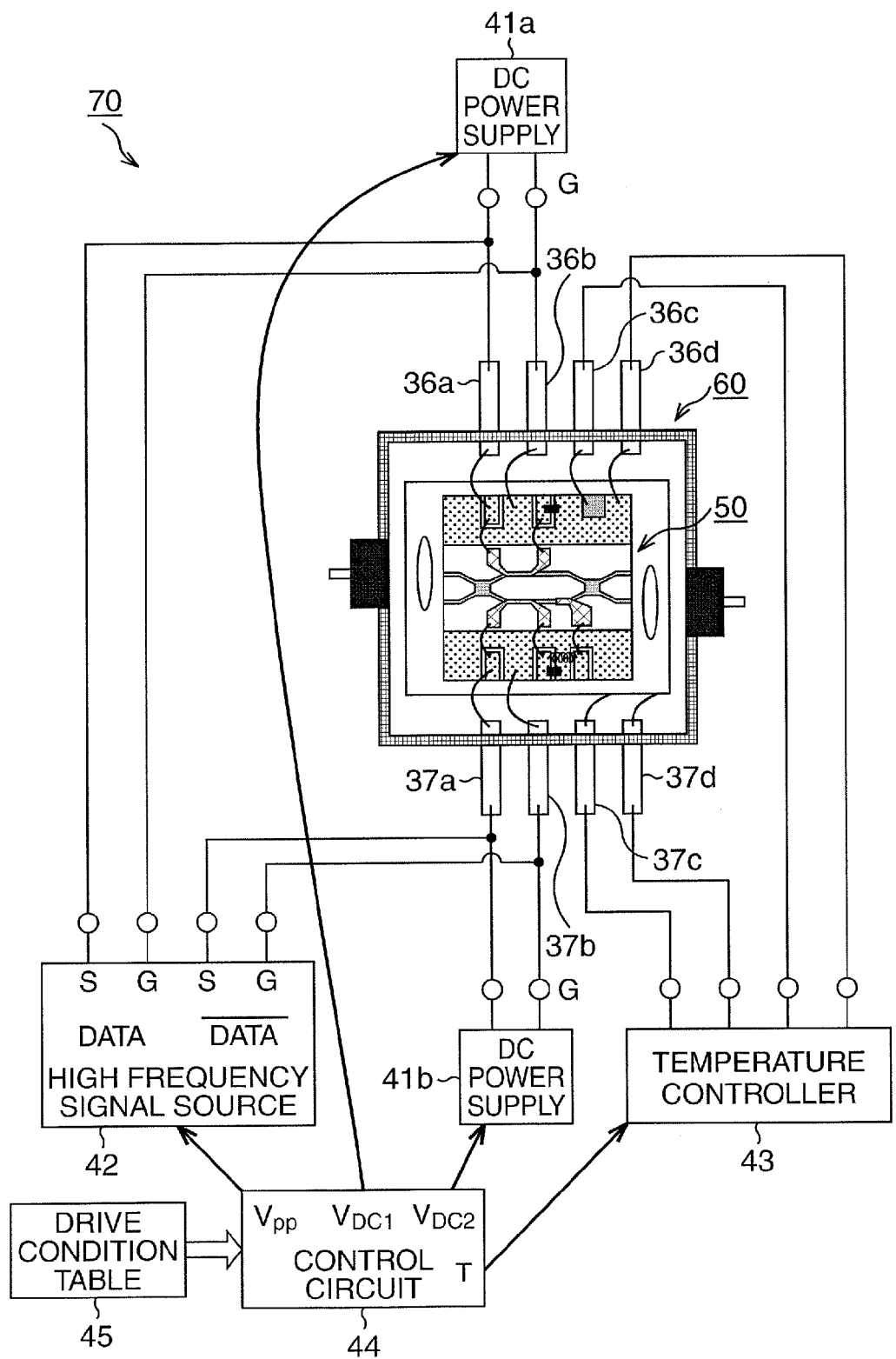
FIG. 17 is a schematic plan view illustrating an optical modulation device mounting the modulator module in FIG. 16.

FIG. 17 is a schematic plan view illustrating an optical modulation device mounting the modulator module in FIG. 16.

A semiconductor Mach-Zehnder modulator 50 used for the optical modulation device (optical transmitter) according to the present embodiment is made up by the semiconductor waveguide including the first optical coupler 11, the arms 12a, 12b, and the second optical coupler 14, and the modulating electrodes 13a, 13b as illustrated in FIG. 15. In the present embodiment, the first optical coupler 11, the arms 12a, 12b, and the second optical coupler 14 are the same as those of the modulator element 20 of the first embodiment. Cross-sectional configurations of the arms 12a, 12b are the same as FIG. 4B of the first embodiment.

In the present embodiment, the lengths of the modulating electrodes 13a, 13b are formed to be the same. Further, a subsidiary electrode 51 is formed only on the arm 12b. The subsidiary electrode 51 is formed by the patterning simultaneously with the modulating electrodes 13a, 13b.

The first modulation signal and the second modulation signal from the modulating electrodes 13a, 13b are applied to the arms 12a, 12b. In this case, a rate of the product of the length $L_1$ of the modulating electrode 13a and the first DC bias $V_{DC1}$ and a product of a length $(L_2+L_3)$ in which a length $L_3$ of the subsidiary electrode 51 is added to the length $L_2$ of the modulating electrode 13b and the second DC bias $V_{DC2}$ is set to be kept constant. Here, the "length of the subsidiary electrode" means that a length of the arm of a part where the subsidiary electrode is electrically connected to the waveguide forming the arm along a longitudinal direction as same as the "length of the modulating electrode".

As illustrated in FIG. 16, an optical modulator module 60 is made up by using the semiconductor Mach-Zehnder modulator 50 constituted as stated above.

The optical modulator module 60 is constituted approximately the same as the optical modulator module 30 in FIG. 5 of the first embodiment other than the semiconductor Mach-Zehnder modulator 50, but it is different in a point that an electrode 31e and an inductor 52 are added to the carrier 31.

The electrode 31e is wire bonded to one end of the subsidiary electrode 51. The inductor 52 is the one, for example, at approximately 100 μH, and it is provided to electrically connect the electrode 31d and the electrode 31e. An electrode pin to independently apply a voltage to the subsidiary electrode 51 is not provided at the module package 33. Accordingly, the number of electrode pins is not increased by forming the subsidiary electrode 51 in the present embodiment.

As illustrated in FIG. 17, an optical modulation device 70 is made up by using the optical modulator module 60 constituted as stated above.

The optical modulation device 70 is constituted approximately the same as the optical modulation device 40 in FIG. 6 of the first embodiment other than the optical modulator module 60.

In the optical modulation device 70, the first DC bias and the first modulation signal are applied to the modulating electrode 13a, the second DC bias and the second modulation signal are applied to the modulating electrode 13b by the DC power supplies 41a, 41b and the high-frequency signal source 42. In this case, the second DC bias is applied to both the modulating electrode 13b and the subsidiary electrode 51 at the arm 12b. On the other hand, the second modulation signal being the little high-frequency signal is applied to the subsidiary electrode 51 owing to the inductor 52.

When it is practically seen as for the modulation signal, it is equivalent that respective modulation signals are applied to the modulating electrodes having the same electrode length at the arms 12a, 12b. On the other hand, when it is practically seen as for the DC bias, it is equivalent that respective DC biases are applied to the electrodes having different electrode lengths at the arms 12a, 12b.

In the present embodiment, the first and second DC biases applied to the modulating electrodes 13a, 13b are matched at the arms 12a, 12b, and the first and second modulation signals applied to the modulating electrodes 13a, 13b are made to have the same amplitude with each other and of which voltage change directions are in reverse. In this case, the lengths of the modulating electrodes 13a, 13b to which the respective modulation signals are practically applied are the same, and therefore, the efficiencies of the phase changes relative to the first and second modulation signals become the same at the arms 12a, 12b. As a result, the zero chirp operation in which the phase change amounts are the same at the arms 12a, 12b is enabled.

Besides, the first and second DC biases are applied to the electrodes having practically different lengths as for the phase difference between the arms resulting from the application of the first and second DC biases determining the phase difference between the arms 12a, 12b. Accordingly, it is possible to adjust the phase difference between the arms 12a, 12b by increasing/decreasing the first and second DC biases while matching the first and second DC biases at the same value as same as the first embodiment.

In the present embodiment, it is possible to adjust the phase difference between the arms 12a, 12b in optimum while keeping the zero chirp operation. Further, the amplitudes of the applied first and second modulation signals are the same at the arms 12a, 12b, and the sizes of the applied first and second DC biases are the same at the arms 12a, 12b, and therefore, it is possible to perform a simple control.

Figure 18:
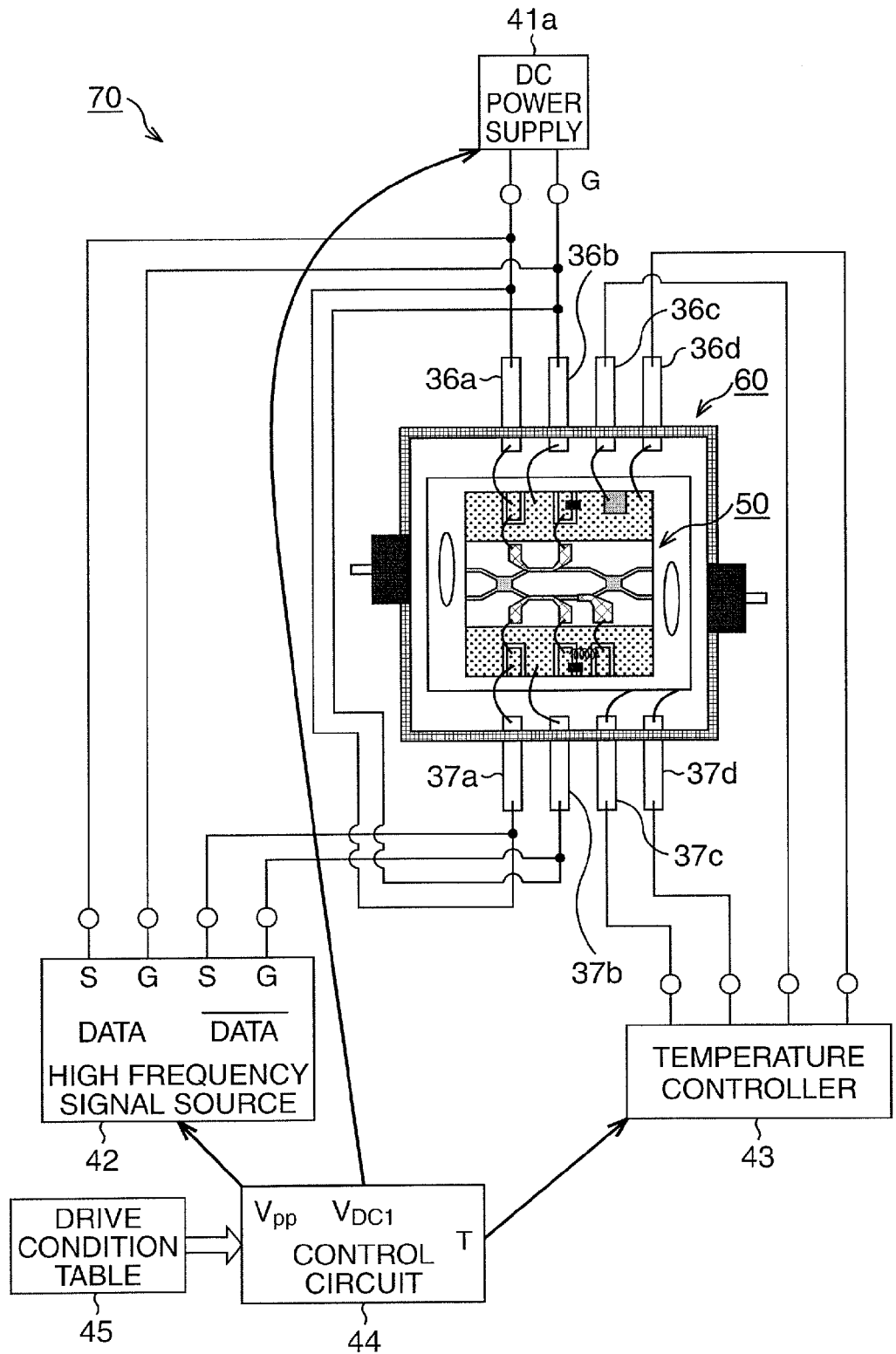
FIG. 18 is a schematic plan view illustrating another example of an optical modulation device according to the fourth embodiment.
Figure 19:
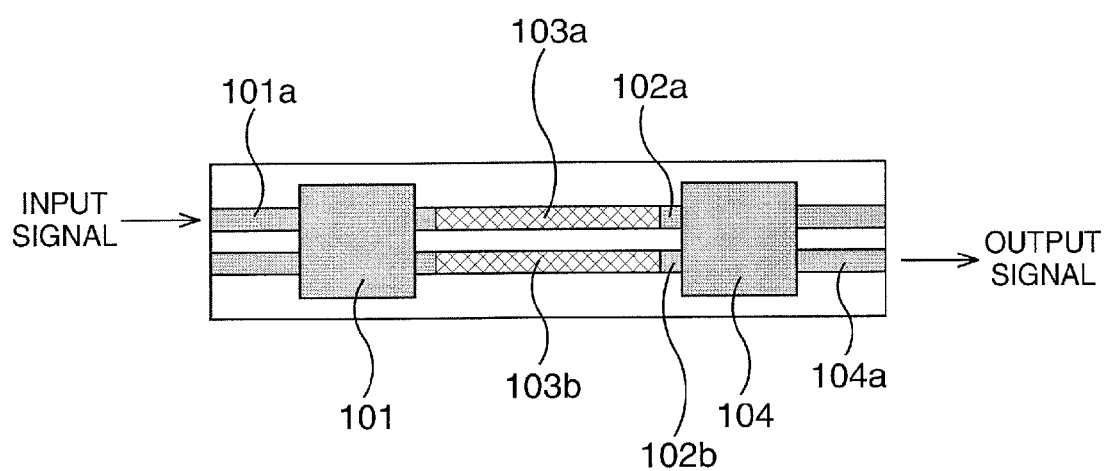
FIG. 19 is a schematic plan view illustrating an example of a semiconductor Mach-Zehnder modulator used for a conventional optical modulation device.
Figure 20A:
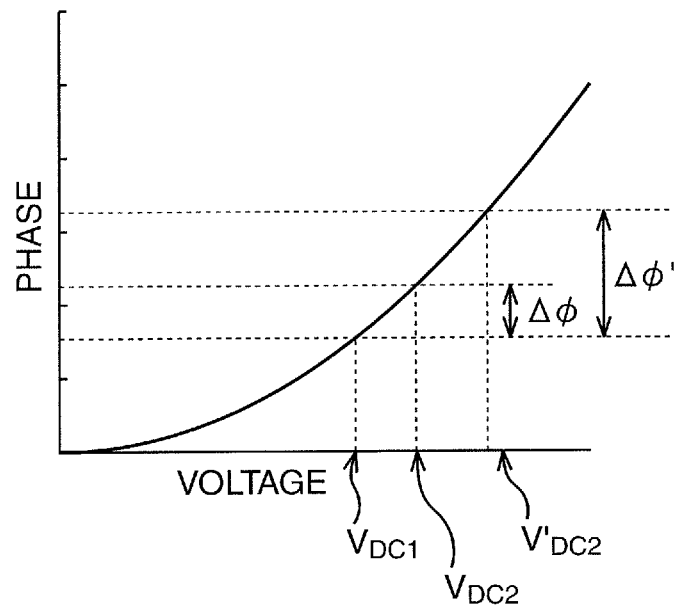
FIG. 20A is a characteristic chart representing a relationship of phases relative to applied voltages to optical waveguides of a modulator element.
Figure 20B:
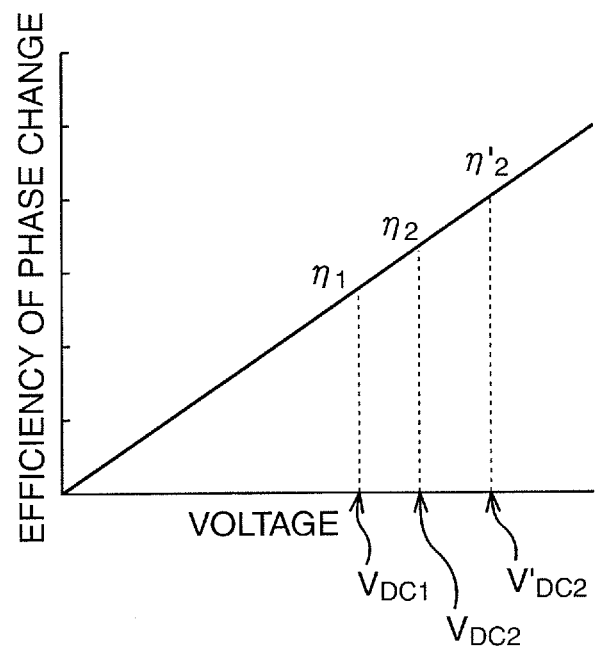
FIG. 20B is a characteristic chart representing a relationship of efficiencies of phase changes relative to the applied voltages to the optical waveguides of the modulator element.//

In the present embodiment, the first DC bias $V_{DC1}$ and the second DC bias $V_{DC2}$ are set to be the same value under the control of the control circuit 44 based at the drive condition table 45 as same as the first embodiment. Accordingly, as illustrated in FIG. 18, the DC power supply 41b is not provided and only the DC power supply 41a may be provided. In this case, the DC power supply 41a is connected between the electrode pins 36a, 36b and between the electrode pins 37a, 37b. The DC power supply 41a applies the DC biases $V_{DC}$ described at the drive condition table 45 between the electrode pins 36a, 36b and between the electrode pins 37a, 37b by the control of the control circuit 44. In this case, the DC biases $V_{DC}$ at the same value are applied to the modulating electrode 13a, the modulating electrode 13b and the subsidiary electrode 51.

As described above, according to the present embodiment, it is possible to enable the optimum control of the phase difference between the arms 12a, 12b and the precise control of the wavelength chirp characteristics with the simple element constitution, and the optical modulation of which device size is small and having the fine characteristics is enabled.

Note that in the first to fourth embodiment, an aspect is represented in which single and constant values $V_{DC1}$, $V_{DC2}$ are described at the drive condition table, and the driving of the optical modulation device is performed based on the table when the rate of the first DC bias $V_{DC1}$ and the second DC bias $V_{DC2}$ is set at a constant value.

Another aspect is conceivable as for the above. For example, the $V_{DC1}$, $V_{DC2}$ to be 1:1 according to the first embodiment, the $V_{DC1}$, $V_{DC2}$ to be 1:3 according to the second embodiment, and the $V_{DC1}$, $V_{DC2}$ to be 2.5:1 according to the third embodiment are described at the drive condition table. The appropriate $V_{DC1}$, $V_{DC2}$ are read from the drive condition table in accordance with a usage state of the MZ type optical modulation device, and the desired zero chirp operation or negative chirp operation may be obtained.

According to each aspect, it is possible to enable the optimum control of the phase difference between the first and second optical waveguides and the precise control of the wavelength chirp characteristics with the simple element constitution, and the optical modulation of which device size is small and having the fine characteristics is enabled.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical modulation device, comprising
a semiconductor Mach-Zehnder modulator splitting and propagating input light, and multiplexing and outputting the propagated lights,
wherein the semiconductor Mach-Zehnder modulator includes:
a first optical waveguide and a second optical waveguide propagating splitted lights;
a first electrode applying a first modulation signal and a first DC bias voltage to the first optical waveguide; and
a second electrode applying a second modulation signal and a second DC bias voltage to the second optical waveguide,
wherein a length of the first electrode is set to be $L_1$, a length of the second electrode is set to be $L_2$, the first DC bias voltage is set to be A, and the second DC bias voltage is set to be B,
the first DC bias voltage and the second DC bias voltage are applied so that a rate of a product $AL_1$ of the length of the first electrode $L_1$ and the first DC bias voltage A and a product $BL_2$ of the length of the second electrode $L_2$ and the second DC bias voltage B is a pre-determined value under the condition of $A:B \neq (L_2)^{1/2}:(L_1)^{1/2}$.

2. The optical modulation device according to claim 1, wherein the length of the first electrode and the length of the second electrode are different, and the rate of the product of the length of the first electrode and the first DC bias voltage and the product of the length of the second electrode and the second DC bias voltage is 1:1.

3. The optical modulation device according to claim 1, wherein the rate of the product of the length of the first electrode and the first DC bias voltage and the product of the length of the second electrode and the second DC bias voltage is 1:4 to 1:5.

4. The optical modulation device according to claim 1, wherein the semiconductor Mach-Zehnder modulator further includes:
a third electrode applying a voltage to the second optical waveguide and formed in addition to the second electrode,
wherein the first electrode and the second electrode have the same length,
the second electrode and the third electrode are connected via an inductor, and
the rate of the product of the length of the first electrode and the first DC bias voltage and the product of the length of the second electrode and the second DC bias voltage is 1:1.

5. The optical modulation device according to claim 1, wherein the first modulation signal and the second modulation signal are alternating current signals of which voltage amplitudes are the same each other and of which voltage change directions are in reverse from one another.

6. The optical modulation device according to claim 1, comprising:
a memory recording a table in which the first DC bias voltage and the second DC bias voltage defined in advance to keep the rate at a constant value are described,
the optical modulation device, further comprising:
a first power supply connected to the first electrode; and
a second power supply connected to the second electrode, wherein the first power supply and the second power supply apply the first DC bias voltage and the second DC bias voltage described at the table to the first electrode and the second electrode.

7. The optical modulation device according to claim 6, further comprising:
a control part controlling the first power supply and the second power supply to apply the first DC bias voltage and the second DC bias voltage described at the table to the first electrode and the second electrode.

8. A driving method of an optical modulation device using a semiconductor Mach-Zehnder modulator splitting and propagating input light, and multiplexing and outputting the propagated lights,
wherein the optical modulation device includes:
a first optical waveguide and a second optical waveguide propagating splitted lights;
a first electrode applying a first modulation signal and a first DC bias voltage to the first optical waveguide; and
a second electrode applying a second modulation signal and a second DC bias voltage to the second optical waveguide,
the driving method of the optical modulation device, comprising:
setting a length of the first electrode to be $L_1$, setting a length of the second electrode to be $L_2$, setting the first DC bias voltage to be A, and setting the second DC bias voltage to be B,
applying the first DC bias voltage and the second DC bias to voltage the first optical waveguide and the second optical waveguide so that a rate of a product $AL_1$ of the length of the first electrode $L_1$ and the first DC bias voltage A and a product $BL_2$ of the length of the second electrode $L_2$ and the second DC bias voltage B is a pre-determined value under the condition of $A:B \neq (L_2)^{1/2}:(L_1)^{1/2}$.

9. The driving method of the optical modulation device according to claim 8,
wherein the length of the first electrode and the length of the second electrode are different, and the rate of the product of the length of the first electrode and the first DC bias voltage and the product of the length of the second electrode and the second DC bias voltage is 1:1.

10. The driving method of the optical modulation device according to claim 8,
wherein the rate of the product of the length of the first electrode and the first DC bias voltage and the product of the length of the second electrode and the second DC bias voltage is 1:4 to 1:5.

11. The driving method of the optical modulation device according to claim 8,
wherein the optical modulation device further includes:
a third electrode applying a voltage to the second optical waveguide and formed in addition to the second electrode,
wherein the first electrode and the second electrode have the same length,
the second electrode and the third electrode are connected via an inductor, and
the rate of the product of the length of the first electrode and the first DC bias voltage and the product of the length of the second electrode and the second DC bias voltage is 1:1.

12. The driving method of the optical modulation device according to claim 8, further comprising:
applying the first modulation signal and the second modulation signal being alternating current signals of which voltage amplitudes are the same each other and of which voltage change directions are in reverse from one another to the first optical waveguide and the second optical waveguide.

13. The driving method of the optical modulation device according to claim 8, further comprising:
using a table describing the first DC bias voltage and the second DC bias voltage defined in advance to keep the rate at a constant value,
wherein the optical modulation device further includes:
a first power supply connected to the first electrode; and
a second power supply connected to the second electrode,
the driving method of the optical modulation device, further comprising:
applying the first DC bias voltage and the second DC bias voltage described at the table to the first electrode and the second electrode by the first power supply and the second power supply.

14. The driving method of the optical modulation device according to claim 13,
wherein the optical modulation device further includes:
a control part controlling the first power supply and the second power supply,
the driving method of the optical modulation device, further comprising:
controlling the first power supply and the second power supply to apply the first DC bias voltage and the second DC bias voltage described at the table to the first electrode and the second electrode by the control part.

15. A manufacturing method of an optical modulation device using a semiconductor Mach-Zehnder modulator splitting and propagating input light, and multiplexing and outputting the propagated lights, comprising:
forming a first optical waveguide and a second optical waveguide propagating splitted light; and
forming a first electrode applying a first modulation signal and a first DC bias voltage to the first optical waveguide on the first optical waveguide and a second electrode applying a second modulation signal and a second DC bias voltage to the second optical waveguide on the second optical waveguide,
the manufacturing method of the optical modulation device, further comprising:
setting a length of the first electrode to be $L_1$, setting a length of the second electrode to be $L_2$, setting the first DC bias voltage to be A, and setting the second DC bias voltage to be B,
determining the first DC bias voltage and the second DC bias voltage so that a rate of a product $AL_1$ of the length of the first electrode $L_1$ and the first DC bias voltage A and a product $BL_2$ of the length of the second electrode $L_2$ and the second DC bias voltage B is a pre-determined value under the condition of $A:B \neq (L_2)^{1/2}:(L_1)^{1/2}$.

16. The manufacturing method of the optical modulation device according to claim 15,
wherein the semiconductor Mach-Zehnder modulator further includes: a third electrode applying a voltage to the second optical waveguide, formed in addition to the second electrode, and connected to the second electrode via an inductor.

17. The manufacturing method of the optical modulation device according to claim 15, further comprising:
creating a table describing the determined first DC bias and second DC bias voltage.

18. The manufacturing method of the optical modulation device according to claim 17, wherein a drive temperature when the determined first DC bias voltage and second DC bias voltage are applied to the first optical waveguide and the second optical waveguide is described at the table in addition to the determined first DC bias voltage and second DC bias voltage.

19. The manufacturing method of the optical modulation device according to claim 15,
wherein the first DC bias and the second DC bias voltage at a center value between a maximum value and a minimum value of an extinction curve of output light when the first DC bias voltage and the second DC bias voltage applied to the first optical waveguide and the second optical waveguide are changed under a state in which the rate of a product of a length of the first electrode and the first DC bias voltage and a product of a length of the second electrode and the second DC bias voltage is kept at a constant value is determined as the first DC bias or the second DC bias voltage, in determining the first DC bias and the second DC bias voltage.

20. The optical modulation device according to claim 4, wherein the third electrode is formed on the second optical waveguide.

* * * * *